(12) United States Patent
Abrahams et al.

(10) Patent No.: US 8,521,631 B2
(45) Date of Patent: Aug. 27, 2013

(54) COMPUTER-IMPLEMENTED SYSTEMS AND METHODS FOR LOAN EVALUATION USING A CREDIT ASSESSMENT FRAMEWORK

(75) Inventors: Clark Richard Abrahams, Cary, NC (US); Mingyuan Zhang, Cary, NC (US)

(73) Assignee: SAS Institute Inc., Cary, NC (US)

(*) Notice: Subject to any disclaimer, the term of this patent is extended or adjusted under 35 U.S.C. 154(b) by 260 days.

(21) Appl. No.: 12/474,941

(22) Filed: May 29, 2009

(65) Prior Publication Data

US 2009/0299911 A1   Dec. 3, 2009

Related U.S. Application Data

(60) Provisional application No. 61/130,319, filed on May 29, 2008.

(51) Int. Cl.
*G06Q 40/00* (2012.01)

(52) U.S. Cl.
USPC ..................................................... 705/36 R

(58) Field of Classification Search
None
See application file for complete search history.

(56) References Cited

U.S. PATENT DOCUMENTS

| | | | |
|---|---|---|---|
| 5,335,291 A | 8/1994 | Kramer et al. | |
| 5,448,684 A | 9/1995 | Holt | |
| 5,500,513 A | 3/1996 | Langhans et al. | |
| 5,519,319 A | 5/1996 | Smith et al. | |
| 5,622,171 A | 4/1997 | Asada et al. | |
| 5,627,886 A | 5/1997 | Bowman | |
| 5,638,492 A | 6/1997 | Maeda et al. | |
| 5,650,722 A | 7/1997 | Smith et al. | |
| 5,675,253 A | 10/1997 | Smith et al. | |
| 5,677,955 A | 10/1997 | Doggett et al. | |
| 5,706,401 A | 1/1998 | Tresp | |
| 5,727,161 A | 3/1998 | Purcell, Jr. | |
| 5,748,780 A | 5/1998 | Stolfo | |
| 5,761,442 A | 6/1998 | Barr et al. | |
| 5,819,226 A | 10/1998 | Gopinathan et al. | |
| 5,832,068 A | 11/1998 | Smith | |
| 5,835,902 A | 11/1998 | Jannarone | |
| 5,884,289 A | 3/1999 | Anderson et al. | |
| 5,903,830 A | 5/1999 | Joao et al. | |
| 5,940,812 A * | 8/1999 | Tengel et al. | 705/38 |
| 5,999,596 A | 12/1999 | Walker et al. | |
| 6,016,480 A | 1/2000 | Houvener et al. | |
| 6,021,943 A | 2/2000 | Chastain | |
| 6,029,154 A | 2/2000 | Pettitt | |
| 6,047,268 A | 4/2000 | Bartoli et al. | |

(Continued)

OTHER PUBLICATIONS

Staten, Michael E., Maximizing the Benefits from Credit Reporting, Transunion White Paper, available at http://www.transunion.com/docs/rev/aboutTransunion/ maximizing_the_Benefits_from_Credit_Reporting%20_Michael_Staten.pdf, (2008).*

(Continued)

*Primary Examiner* — Virpi Kanervo
(74) *Attorney, Agent, or Firm* — Kilpatrick Townsend & Stockton LLP

(57) ABSTRACT

Systems and methods are provided for evaluating loan applications. A computer environment can include a loan evaluation system which operates on a processor-based system and which evaluates loan applications. A credit assessment framework is also provided for operating on the processor-based system and has a data connection to the loan evaluation system. The credit assessment framework generates a categorization of credit risk for each of the loan applications to be evaluated.

39 Claims, 15 Drawing Sheets

(56) References Cited

U.S. PATENT DOCUMENTS

| | | | |
|---|---|---|---|
| 6,047,287 A | 4/2000 | Caruna | |
| 6,064,990 A | 5/2000 | Goldsmith | |
| 6,112,190 A | 8/2000 | Fletcher et al. | |
| 6,122,624 A | 9/2000 | Tetro et al. | |
| 6,125,349 A | 9/2000 | Maher | |
| 6,128,602 A | 10/2000 | Northington et al. | |
| 6,170,744 B1 | 1/2001 | Lee et al. | |
| 6,202,053 B1 | 3/2001 | Christiansen et al. | |
| 6,251,608 B1 | 6/2001 | Levy | |
| 6,330,546 B1 | 12/2001 | Gopinathan et al. | |
| 6,360,326 B1 | 3/2002 | Hiles | |
| 6,388,592 B1 | 5/2002 | Natarajan | |
| 6,401,198 B1 | 6/2002 | Harmer et al. | |
| 6,422,462 B1 | 7/2002 | Cohen | |
| 6,453,206 B1 | 9/2002 | Soraghan et al. | |
| 6,516,056 B1 | 2/2003 | Justice et al. | |
| 6,549,861 B1 | 4/2003 | Mark et al. | |
| 6,570,968 B1 | 5/2003 | Marchand et al. | |
| 6,599,702 B1 | 7/2003 | Levy | |
| 6,601,049 B1 | 7/2003 | Cooper | |
| 6,613,519 B1 | 9/2003 | Levy | |
| 6,622,125 B1 | 9/2003 | Cragun et al. | |
| 6,631,212 B1 | 10/2003 | Luo et al. | |
| 6,650,779 B2 | 11/2003 | Vachesvanos et al. | |
| 6,675,145 B1 | 1/2004 | Yehia et al. | |
| 6,678,640 B2 | 1/2004 | Ishida et al. | |
| 6,845,336 B2 | 1/2005 | Kodukula et al. | |
| 6,901,398 B1 | 5/2005 | Horvitz et al. | |
| 7,117,191 B2 | 10/2006 | Gavan et al. | |
| 7,191,150 B1 | 3/2007 | Shao et al. | |
| 7,269,516 B2 | 9/2007 | Brunner et al. | |
| 7,392,216 B1 | 6/2008 | Palmgren et al. | |
| 7,403,922 B1 | 7/2008 | Lewis et al. | |
| 7,455,226 B1 | 11/2008 | Hammond et al. | |
| 7,461,048 B2 | 12/2008 | Teverovskiy et al. | |
| 7,467,119 B2 | 12/2008 | Saidi et al. | |
| 7,480,640 B1 | 1/2009 | Elad et al. | |
| 7,536,348 B2 | 5/2009 | Shao et al. | |
| 7,562,058 B2 | 7/2009 | Pinto et al. | |
| 7,580,798 B2 | 8/2009 | Brunner et al. | |
| 7,610,257 B1 | 10/2009 | Abrahams | |
| 7,761,379 B2 | 7/2010 | Zoldie et al. | |
| 7,765,148 B2 | 7/2010 | German et al. | |
| 7,788,195 B1 | 8/2010 | Subramanian et al. | |
| 7,801,839 B2 | 9/2010 | Kates et al. | |
| 7,912,773 B1 | 3/2011 | Subramanian et al. | |
| 7,962,404 B1* | 6/2011 | Metzger et al. | 705/38 |
| 8,065,227 B1* | 11/2011 | Beckman | 705/39 |
| 8,280,805 B1 | 10/2012 | Abrahams et al. | |
| 2001/0056379 A1 | 12/2001 | Fujinaga et al. | |
| 2002/0055954 A1 | 5/2002 | Breuer | |
| 2002/0099635 A1 | 7/2002 | Guiragosian | |
| 2002/0138417 A1 | 9/2002 | Lawrence | |
| 2002/0194119 A1 | 12/2002 | Wright et al. | |
| 2003/0093366 A1* | 5/2003 | Halper et al. | 705/38 |
| 2003/0097330 A1 | 5/2003 | Hillmer et al. | |
| 2003/0140000 A1 | 7/2003 | Lee | |
| 2003/0191709 A1 | 10/2003 | Elston et al. | |
| 2004/0039688 A1 | 2/2004 | Sulkowski et al. | |
| 2004/0186815 A1 | 9/2004 | Stockfisch | |
| 2004/0236696 A1 | 11/2004 | Aoki et al. | |
| 2004/0267660 A1* | 12/2004 | Greenwood et al. | 705/38 |
| 2005/0055373 A1 | 3/2005 | Forman | |
| 2005/0060207 A1 | 3/2005 | Weidner et al. | |
| 2005/0065871 A1* | 3/2005 | Gerhart et al. | 705/38 |
| 2005/0065872 A1 | 3/2005 | Moebs et al. | |
| 2005/0076230 A1 | 4/2005 | Redenbaugh et al. | |
| 2005/0097320 A1 | 5/2005 | Golan et al. | |
| 2005/0131873 A1 | 6/2005 | Fan et al. | |
| 2005/0222928 A1 | 10/2005 | Steier et al. | |
| 2006/0020814 A1 | 1/2006 | Lieblich et al. | |
| 2006/0085325 A1* | 4/2006 | Jammal et al. | 705/38 |
| 2006/0106700 A1 | 5/2006 | Boren et al. | |
| 2006/0181411 A1 | 8/2006 | Fast et al. | |
| 2006/0195391 A1 | 8/2006 | Stanelle | |
| 2006/0212386 A1* | 9/2006 | Willey et al. | 705/38 |
| 2006/0218169 A1 | 9/2006 | Steinberg et al. | |
| 2006/0282359 A1 | 12/2006 | Nobili et al. | |
| 2007/0038567 A1 | 2/2007 | Allaire et al. | |
| 2007/0055595 A1 | 3/2007 | Keyes et al. | |
| 2007/0106582 A1 | 5/2007 | Baker et al. | |
| 2007/0136187 A1* | 6/2007 | Libman | 705/38 |
| 2007/0192167 A1 | 8/2007 | Lei et al. | |
| 2007/0198401 A1* | 8/2007 | Kunz | 705/38 |
| 2007/0219817 A1 | 9/2007 | Wu | |
| 2007/0226129 A1 | 9/2007 | Liao et al. | |
| 2007/0239606 A1 | 10/2007 | Eisen | |
| 2008/0114783 A1 | 5/2008 | Nguyen et al. | |
| 2008/0126267 A1* | 5/2008 | Rosen et al. | 705/36 R |
| 2008/0133518 A1 | 6/2008 | Kapoor et al. | |
| 2008/0134236 A1 | 6/2008 | Iijima et al. | |
| 2008/0195528 A1 | 8/2008 | Keithley | |
| 2008/0243569 A1* | 10/2008 | Hadden | 705/7 |
| 2008/0301038 A1* | 12/2008 | Anderson et al. | 705/38 |
| 2009/0018955 A1* | 1/2009 | Chen et al. | 705/39 |
| 2009/0125973 A1 | 5/2009 | Byers et al. | |
| 2009/0171834 A1* | 7/2009 | Liu et al. | 705/38 |
| 2009/0192855 A1 | 7/2009 | Subramanian et al. | |
| 2009/0192957 A1 | 7/2009 | Subramanian et al. | |
| 2009/0254487 A1* | 10/2009 | Dhar et al. | 705/80 |
| 2009/0299896 A1 | 12/2009 | Zhang | |
| 2009/0307028 A1 | 12/2009 | Eldon et al. | |
| 2010/0042454 A1* | 2/2010 | Liao et al. | 705/7 |
| 2011/0112955 A1 | 5/2011 | Nolan et al. | |
| 2012/0296806 A1 | 11/2012 | Abrahams | |

OTHER PUBLICATIONS

Deng et al., Irrational Borrowers and the Pricing of Residential Mortgages, available at http://w4.stern.nyu.edu/finance/docs/pdfs/Seminars/073f-deng.pdf, (Sep. 2007).*

Hall, Arden, Controlling for Burnout in Estimating Mortgage Prepayment Models, Journal of Housing Economics, vol. 9, pp. 215-232, (2000).*

Staten, Michael E., Maximizing the Benefits from Credit Reporting, Transunion White Paper, available at http://www.transunion.com/docs/rev/aboutTransunion/ maximizing_the_Benefits_from_Credit_Reporting%20_Michael_Staten.pdf, (2008).*

Andrews, C.J., "Evaluating Risk Management Strategies in Resource Planning," IEEE Transactions on Power Systems, vol. 10, Issue 1, pp. 420-426 (Feb. 1995).

Bond, Erik et al., "Risk Analysis for the Security of VDOT Smart Traffic Center," Systems and Information Engineering Design Symposium, IEEE, pp. 1-6 (Apr. 27, 2007).

Kahn, Shulamit, "Economic Estimates of the Value of Life," IEEE Technology and Society Magazine, vol. 5, Issue 2, pp. 24-31 (Jun. 1986).

Srivatsa, Mudhakar et al., "Securing Information flows: A quantitative risk analysis approach," Military Communications Conference, IEEE, pp. 1-7 (Nov. 16-19, 2008).

Credit Technologies, Inc. News and Press Center—19 pages at www.credittechnologies.com/news_center.asp downloaded Mar. 14, 2011.

Brause, Rudiger W., "Cascaded Vector Quantization by Non-Linear PCA Network Layers", IEEE, pp. 154-160 (1994).

Chan, Lipchen Alex et al., "Automatic target detection using dualband infrared imager", Acoustics, Speech, and Signal PICASSP'OO. Proceedings, 2000 IEEE International Conference, pp. 2286-2289 (Jun. 9, 2000).

Chatterjee, Chanchal et al., "Self-Organizing Algorithms for Generalized Eigen-Decomposition", IEEE Transactions on Neural Networks, vol. 8, No. 6, pp. 1518-1530 (Nov. 1997).

Chen, Yupeng et al., "High Resolution Adaptive Bearing Estimation Using a Complex-Weighted Neural Network", IEEE, 0-7803-0532-9/92, pp. II-317-IIII-320 (1992).

Mehrotra, Kishan et al., "Elements of Artificial Neural Networks", MIT Press, pp. 11, 25, 71 76, 85-87, 157, 170-171 (1997).

Wong, AS.Y. et al., "A Unified Sequential Method for PCA", IEEE, pp. 583•586 (1999).

Lazarevic, Aleksandar et al., "Feature Bagging for Outlier Detection," Research Track Paper, pp. 157-166 (2005).

Pelleg, Dan et al., "Active Learning for Anomaly and Rare-Category Detection," School of Computer Science, Carnegie Mellon University, 8 pp. (2004).

Abdel-Wahhab, O. et al., "Image compression using multi-layer neural networks,", Proceedings of the Second IEEE Symposium on Computers and Communications, vol. 144, Issue 5, pp. 307-312 (Oct. 1997).

Almgren, Magnus et al., "Using Active Learning in Intrusion Detection," Proceedings of the 17" IEEE Computer Security Foundations Workshop, 11 pp. (2004).

Andras, Peter, "The Equivalence of Support Vector Machine and Regularization Neural Networks," Neural Processing Letters, 65, pp. 97-104 (2002).

Gabrys, Bogdan et al., "Combining labelled and unlabelled data in the design of pattern classification systems," International Journal of Approximate Reasoning, 35, pp. 251-273 (2004).

Gunter, Simon, "Multiple Classifier Systems in Offline Cursive Handwriting Recognition," cover page and p. 4 (2004).

Hawkins, Simon et al., "Outlier Detection Using Replicator Neural Networks," Proceedings of the Fifth International Conference and Data Warehousing and Knowledge Discovery, 10 pp. (2002).

Hinterseer, Kris, "The Wolfsberg Anti-Money Laundering Principles," Journal of Money Laundering Control, vol. 5, No. I pp. 25-41 (Summer 2001).

Miyazaki, Anthony D. et al., "Internet Privacy and Security: An Examination of Online Retailer Disclosures," Journal of Public Policy & Marketing, vol. 19, No. I, pp. 54-61 (Spring 2000).

Tsai, Chieh-Yuan, et al., "A Dynamic Web Service based Data Mining Process System", Proceedings of the 2005 The Fifth International Conference on Computer and Information Technology, pp. 1033-1039 (2005).

West, David et al., "Neural network ensemble strategies for financial decision applications," Computers & Operations Research, 32, pp. 2543-2559 (2005).

Williams, Graham et al., "A Comparative Study of RNN for Outlier Detection in Data Mining," Proceedings of the 2002 IEEE International Conference on Data Mining 12 pp. (2002).

Zhang, Tiezhu et al., "Study on the Application of Dynamic Balanced Scorecard in the Service Industry", 2008 International Conference on Intelligent Computation Technology and Automation, Digital Object Identifier: 10.1109/ICICTA.2008.359, pp. 1158-1162 (2008).

Oltmans, Arnold Wayne; Aggregate Loan Quality Assessment in the Farm Credit System; Ph.D. Thesis Abstract; University of Illinois at Urbana-Champaign, (1990). 2 pp.

Anonymous; Community Banks Face Challenges, Opportunities in Changing Economic Times; Item Processing Report, vol. 13, Iss. 7, (Apr. 2002) 2 pp.

Xing, Fang Xiao; A Research about Option-GARCH Method in Credit Risk Measurement; (Abstract); M.S. Thesis; East China Normal University (People's Republic of China), (2008) 2 pp.

Final Office Action of Nov. 29, 2012 for U.S. Appl. No. 12/418,186, 16 pages.

Non-Final Office Action of Jun. 24, 2011 for U.S. Appl. No. 12/418,186, 16 pages.

Notice of Allowance of Sep. 29, 2010 for U.S. Appl. No. 11/691,277, 9 pages.

Non-Final Office Action of Sep. 28, 2010 for U.S. Appl. No. 11/691,270, 17 pages.

Final Office Action of Mar. 22, 2011 for U.S. Appl. No. 11/691,270, 16 pages.

Non-Final Office Action of Jul. 14, 2011 for U.S. Appl. No. 12/325,468, 9 pages.

Notice of Allowance of May 1, 2012 for U.S. Appl. No. 12/325,468, 14 pages.

Non-Final Office Action of Aug. 8, 2011 for U.S. Appl. No. 12/475,150, 21 pages.

Final Office Action of Jun. 26, 2012 for U.S. Appl. No. 12/475,150, 19 pages.

Notice of Allowance of Mar. 1, 2013 for U.S. Appl. No. 12/475,150, 14 pages.

Non-Final Office Action of Sep. 20, 2011 for U.S. Appl. No. 12/418,174, 15 pages.

Final Office Action of Aug. 2, 2012 for U.S. Appl. No. 12/418,174, 14 pages.

Non-Final Office Action of Sep. 7, 2012 for U.S. Appl. No. 13/561,121, 16 pages.

* cited by examiner

| SEGMENT HANDLE | CAPACITY | CAPITAL | PAYMENT PERFORMANCE | RISK RATING |
|---|---|---|---|---|
| 1 | H | H | G | 10 |
| 2 | H | H | F | 9 |
| 3 | H | H | P | 8 |
| 4 | H | L | G | 8 |
| 5 | H | L | F | 7 |
| 6 | H | L | P | 5 |
| 7 | L | H | G | 7 |
| 8 | L | H | F | 6 |
| 9 | L | H | P | 4 |
| 10 | L | L | G | 5 |
| 11 | L | L | F | 3 |
| 12 | L | L | P | 1 |

| KEY U/W FACTORS | TYPICAL U/W SYSTEM | CCAF |
|---|---|---|
| CHARACTER (PAYMENT HISTORY) | CREDIT HISTORY DOMINANT, EDUCATION, YRS IN PROFESSION | CREDIT + CASH PAYMENTS, EDUCATION, YRS IN PROFESSION |
| CAPACITY (INCOME, DEBT) | DOCUMENTED/UNDOCUMENTED INCOME<br><br>CREDIT OBLIGATIONS | VERIFIED INCOME, #DEPENDANTS,<br><br>CREDIT + ALTERNATIVE DATA (CASH OBLIGATIONS)<br><br>FUTURE INCOME STREAM |
| CAPITAL (LIQUIDITY, NET WORTH) | CHECKING, SAVINGS ACCOUNTS, INVESTMENTS | BANK ACCOUNTS, INVESTMENT ACCOUNTS, INSURANCE PRODUCTS W/CASH VALUES, INS PROTECTION |
| COLLATERAL (CUR/FUTURE VALUE) | CURRENT APPRAISAL | CUR APPRAISAL, RANGE OF FUTURE SCENARIO VALUATION |
| CONDITIONS (PRODUCT TERMS) | "PRIME" BORROWERS CAN BE SOLD "SUB-PRIME" LOANS, RISK-BASED MIS-PRICING, PAYMENT-MINIMIZATION FOCUS | MATCH BORROWERS TO RIGHT LOAN PRODUCT, DEFAULT ODDS GEARED TO HOMOGENEOUS HANDLE GROUPS, AFFORDABILITY/SUITABILITY FOCUS FUTURE PAYMENT STREAM |

*Fig. 7*

| DELINQUENCY TIMEFRAME/ | MORTGAGE TRADES SEVERITY | | | | INSTALLMENT/ REVOLVING TRADES SEVERITY | | | | ALTERNATIVE CASH PAYMENT TRADES SEVERITY | | | |
|---|---|---|---|---|---|---|---|---|---|---|---|---|
| | 0 | 1 | 2 | 3+ | 0 | 1 | 2 | 3+ | 0 | 1 | 2 | 3+ |
| LESS THAN 12 MONTHS | | | | | | | | | | | | |
| 30 DAYS PAST DUE | G | F | F | P | G | G | F | F | G | F | F | F |
| 60 DAYS PAST DUE | G | P | P | P | G | F | P | P | G | F | P | P |
| 90 DAYS PAST DUE | G | P | P | P | G | P | P | P | G | P | P | P |
| 12-24 MONTHS | | | | | | | | | | | | |
| 30 DAYS PAST DUE | G | G | F | F | G | G | G | F | G | G | F | P |
| 60 DAYS PAST DUE | G | P | P | P | G | F | F | P | G | F | P | P |
| 90 DAYS PAST DUE | G | P | P | P | G | P | P | P | G | P | P | P |
| OVER 24 MONTHS OLD | | | | | | | | | | | | |
| 30 DAYS PAST DUE | G | G | G | G | G | G | G | G | G | G | G | F |
| 60 DAYS PAST DUE | G | F | P | F | G | G | G | F | G | G | F | P |
| 90 DAYS PAST DUE | G | P | P | P | G | F | F | P | G | P | P | P |

*Fig. 8*

| CASE | OVERALL | MORTGAGE | INSTALL/REV | CASH PAY |
|---|---|---|---|---|
| 1 | G | G | G | G |
| 2 | F | G | G | F |
| 3 | P | G | G | P |
| 4 | F | G | F | G |
| 5 | F | G | F | F |
| 6 | P | G | F | P |
| 7 | P | G | P | G |
| 8 | P | G | P | F |
| 9 | P | G | P | P |
| 10 | F | F | G | G |
| 11 | F | F | G | F |
| 12 | P | F | G | P |
| 13 | F | F | F | G |
| 14 | F | F | F | F |
| 15 | P | F | F | P |
| 16 | P | F | P | G |
| 17 | P | F | P | F |
| 18 | P | F | P | P |
| 19 | P | P | G | G |
| 20 | P | P | G | F |
| 21 | P | P | G | P |
| 22 | P | P | F | G |
| 23 | P | P | F | F |
| 24 | P | P | F | P |
| 25 | P | P | P | G |
| 26 | P | P | P | F |
| 27 | P | P | P | P |

*Fig. 9*

| PRIMARY FACTORS | CATEGORIES, DEFINITIONS & VALUE ASSIGNMENTS | | |
|---|---|---|---|
| CAPITAL | G-HIGH NET WORTH AND LIQUIDITY | F-MODERATE NET WORTH AND SUFFICIENT LIQUIDITY | P-LOW NET WORTH AND MINIMAL SAVINGS |
| CHARACTER: PAYMENT HISTORY FOR ALL CREDIT AND CASH TRADE LINES | G-BASED ON PAST DUE OCCURRENCE FOR <1r, 1-2 YRS, >2YR SEP. BY TRADE LINE. | F-BASED ON PAST DUE OCCURRENCE FOR <1r, 1-2 YRS, >2YR SEP. BY TRADE LINE. | P-BASED ON PAST DUE OCCURRENCE FOR <1r, 1-2 YRS, >2YR SEP. BY TRADE LINE. |
| CAPACITY | H-DTI <45% OR DISCRETIONARY MO. INC. >2xMORTGAGE PAYMENT | L-DTI 45%+ AND DISCRETIONARY MO. INC. <2xMORTGAGE PAYMENT | |
| COLLATERAL AND CONDITIONS EXPOSURE | L-LTV 80% OR LESS | H-LTV 81%+ | |

Fig. 10

| PRIMARY FACTORS | CATEGORIES, DEFINITIONS & VALUE ASSIGNMENTS | | |
|---|---|---|---|
| CAPITAL | G-HIGH NET WORTH AND LIQUIDITY | F-MODERATE NET WORTH AND SUFFICIENT LIQUIDITY | P-LOW NET WORTH AND MINIMAL SAVINGS |
| CHARACTER: PAYMENT HISTORY FOR ALL CREDIT AND CASH TRADE LINES | G-BASED ON PAST DUE OCCURRENCE FOR <1r, 1-2 YRS.>2YR SEP. BY TRADE LINE. | F-BASED ON PAST DUE OCCURRENCE FOR <1r, 1-2 YRS.>2YR SEP. BY TRADE LINE. | P-BASED ON PAST DUE OCCURRENCE FOR <1r, 1-2 YRS.>2YR SEP. BY TRADE LINE. |
| CAPACITY | H-DTI <40% OR DISCRETIONARY MO. INC. >3xMORTGAGE PAYMENT | L-DTI 40%+ AND DISCRETIONARY MO. INC. <3xMORTGAGE PAYMENT | |
| COLLATERAL AND CONDITIONS EXPOSURE | L-LTV 75% OR LESS | H-LTV 76%+ | |

Fig. 11

| HANDLE | CAPITAL | CHARACTER: PAYMENT HISTORY | CAPACITY | COLLATERAL/ CONDITIONS |
|---|---|---|---|---|
| 1 | G | G | H | L |
| 2 | G | G | L | L |
| 3 | G | F | H | L |
| 4 | G | F | L | L |
| 5 | G | P | H | L |
| 6 | G | P | L | L |
| 7 | F | G | H | L |
| 8 | F | G | L | L |
| 9 | F | F | H | L |
| 10 | F | F | L | L |
| 11 | F | P | H | L |
| 12 | F | P | L | L |
| 13 | P | G | H | L |
| 14 | P | G | L | L |
| 15 | P | F | H | L |
| 16 | P | F | L | L |
| 17 | P | P | H | L |
| 18 | P | P | L | L |
| 19 | G | G | H | H |
| 20 | G | G | L | H |
| 21 | G | F | H | H |
| 22 | G | F | L | H |
| 23 | G | P | H | H |
| 24 | G | P | L | H |
| 25 | F | G | H | H |
| 26 | F | G | L | H |
| 27 | F | F | H | H |
| 28 | F | F | L | H |
| 29 | F | P | H | H |
| 30 | F | P | L | H |
| 31 | P | G | H | H |
| 32 | P | G | L | H |
| 33 | P | F | H | H |
| 34 | P | F | L | H |
| 35 | P | P | H | H |
| 36 | P | P | L | H |

*Fig. 12*

| MONTHS OF RESERVES | G- 6 MONTHS+ | F-3-5 MONTHS | P- 2 MONTHS OR LESS |
|---|---|---|---|
| SIMILAR HOUSING EXPENSE | G- 120% OR LESS OF PREVIOUS PAYMENT | F- >120-135% OF PREVIOUS PAYMENT | P- >135% OF PREVIOUS PAYMENT |
| TIME IN PROFESSION | G- 5 YRS+ | F-3-4 YRS | P- <3 YRS |
| STRONG LIQUID ASSETS | G- >10% LOAN AMT. | F-5 TO 9% LOAN AMT. | P- 4% OR LESS LOAN AMT. |
| HISTORY OF HANDLING HIGHER DEBT | G- 3+YRS | F- 1-2 YRS | P- <1 YR |
| DISCRETIONARY INCOME | G- >$2M/MO. | F- $1 TO 2M/MO. | P- <$1M/MO. |
| RELATIONSHIP | G- 2+LOAN, DEPOSIT, INVESTMENT ACCOUNTS | F- 1 LOAN, DEPOSIT, OR INVESTMENT ACCOUNT | P- NONE |
| MANDATORY RESERVE OR PRINCIPAL PAYDOWN W/RE-AMORTIZATION AT RESET DATE IF HIGHER PAYMENT REQUIRED | G- ADDITIONAL 20% OF MONTHLY PAYMENT SET IN RESERVE OR PAID TOWARDS PRINCIPAL EACH MONTH FOR FIRST 30 MONTHS | F- ADDITIONAL 10% OF MONTHLY PAYMENT SET IN RESERVE OR PAID TOWARDS PRINCIPAL EACH MONTH FOR FIRST 30 MONTHS | P- NONE |

*Fig. 13*

| CAPITAL | PAYMENT HISTORY | CAPACITY | LOW EXPO COLL/COND | HIGH EXPO COLL/COND | LOW EXPO COLL/COND | HIGH EXPO COLL/COND |
|---|---|---|---|---|---|---|
| GOOD | GOOD | LOW | 1 ACCEPT | 19 ACCEPT | 37 n/a | 55 n/a |
| GOOD | GOOD | HIGH | 2 ACCEPT | 20 STAGE 2 | 38 n/a | 56 DENIAL |
| GOOD | FAIR | LOW | 3 ACCEPT | 21 STAGE 2 | 39 n/a | 57 DENIAL |
| GOOD | FAIR | HIGH | 4 STAGE 2 | 22 STAGE 2 | 40 DENIAL | 58 DENIAL |
| GOOD | POOR | LOW | 5 ACCEPT | 23 STAGE 2 | 41 n/a | 59 DENIAL |
| GOOD | POOR | HIGH | 6 STAGE 2 | 24 DENIAL | 42 n/a | 60 n/a |
| FAIR | GOOD | LOW | 7 ACCEPT | 25 ACCEPT | 43 n/a | 61 n/a |
| FAIR | GOOD | HIGH | 8 ACCEPT | 26 STAGE 2 | 44 n/a | 62 DENIAL |
| FAIR | FAIR | LOW | 9 ACCEPT | 27 STAGE 2 | 45 n/a | 63 DENIAL |
| FAIR | FAIR | HIGH | 10 STAGE 2 | 28 STAGE 2 | 46 DENIAL | 64 DENIAL |
| FAIR | POOR | LOW | 11 ACCEPT | 29 DENIAL | 47 n/a | 65 DENIAL |
| FAIR | POOR | HIGH | 12 STAGE 2 | 30 DENIAL | 48 DENIAL | 66 n/a |
| POOR | GOOD | LOW | 13 ACCEPT | 31 STAGE 2 | 49 n/a | 67 DENIAL |
| POOR | GOOD | HIGH | 14 ACCEPT | 32 STAGE 2 | 50 n/a | 68 DENIAL |
| POOR | FAIR | LOW | 15 STAGE 2 | 33 STAGE 2 | 51 DENIAL | 69 DENIAL |
| POOR | FAIR | HIGH | 16 STAGE 2 | 34 DENIAL | 52 DENIAL | 70 n/a |
| POOR | POOR | LOW | 17 STAGE 2 | 35 DECLINE | 53 DENIAL | 71 n/a |
| POOR | POOR | HIGH | 18 STAGE 2 | 36 DECLINE | 54 DENIAL | 72 n/a |

Fig. 14

COMPUTER-IMPLEMENTED SYSTEMS AND METHODS FOR LOAN EVALUATION USING A CREDIT ASSESSMENT FRAMEWORK

CROSS-REFERENCE TO RELATED APPLICATION

This application claims priority to and the benefit of the following applications: U.S. Application Ser. No. 61/130,319, (entitled "Computer-Implemented Risk Evaluation And Model Validation Systems And Methods" and filed on May 29, 2008); and U.S. patent application Ser. No. 12/325,468 filed Dec. 1, 2008 entitled "Computer-Implemented Risk Evaluation Systems And Methods" which claims priority to U.S. Patent Application Ser. No. 60/991,050 filed Nov. 29, 2007 entitled "Computer-Implemented Risk Evaluation Systems And Methods." The entire disclosures (including any and all figures) of all of these applications are incorporated herein by reference.

TECHNICAL FIELD

This document relates generally to computer-implemented loan evaluation systems and more particularly to computer-implemented loan evaluation systems using a credit assessment framework.

BACKGROUND

The magnitude of the current economic crisis makes it abundantly clear that there is significant room, and need, for improvement in current credit assessment approaches. With fallout from the 2007 mortgage market problems lingering into 2008, large investment banks and other institutions have being forced to sharply increase their write-offs on mortgage-linked assets to the scale of tens of billions of dollars. As the subprime mortgage market crisis continues to unfold, lenders, investors and other market participants are exploring cause and cure of the subprime problems, especially in the area of underwriting and the technology that facilitate automation in that area.

It has been recognized that development in automated underwriting technology has played a significant role in encouraging lenders to penetrate deeper into the subprime loan pool. To a large extent, subprime lenders believed any additional risk they were taking on was covered using advances in credit scoring, and scoring system policy overlays, that enabled them to effectively price that risk and charge borrowers on the basis of their fully quantified credit worthiness. This contributed to the rapid development of the subprime loan market and created greater access to home-ownership for some segments of borrowers, such as low income and minority households. However, improper use of credit scoring and automated underwriting presented incomplete risk analyses and weakened underwriting standards and policy, with the end-result being a drop in loan quality.

SUMMARY

In accordance with the teachings provided herein, systems and methods for operation upon data processing devices are provided for evaluating loan applications. As an illustration of such a system and method, a computer environment can include a loan evaluation system which operates on a processor-based system and which evaluates loan applications. A credit assessment framework is also provided for operating on the processor-based system and has a data connection to the loan evaluation system. The credit assessment framework uses business context and a plurality of factors in order to generate a categorization of credit risk for each of the loan applications to be evaluated. The generated categorization is stored in a computer-readable storage medium and is relative to a plurality of primary underwriting factors via a transaction contour identifier. The transaction contour identifier provides a single number for rating strengths and weaknesses relative to the primary underwriting factors. The credit assessment framework further including a judgmental system for incorporating judgmental components for facilitating the generation of the categorization of credit risk.

As another example, a system and method can be configured with a credit assessment framework which provides a consistent approach by using computing technology, and safe and sound model development and validation process. In this example, the credit assessment framework affords a sustainable and sensible segmentation based on all primary credit factors and then offers a systematic means for taking appropriate actions relative to those identified segments, and for ongoing monitoring of the impact of those actions in a comprehensive and efficient manner. The credit assessment framework accomplishes this by: 1) expanding the boundaries of information, 2) appropriately segmenting loan applicants based upon primary factors, 3) layering in needed secondary qualification factors, 4) assigning actions for each identified segment, and 5) putting in place an adaptable policy mechanism that is responsive to the evolving economic climate.

As yet another example, a system and method can be configured to include a credit assessment framework which addresses the following aspects:
1. The credit assessment framework ensures inclusion of primary predictive factors that cover the full spectrum of relevant qualification criteria, and both determines, and reveals, how they combine, to produce outcomes. Previous approaches, such as credit scoring which relies on historical data, do not have this capability, nor do they possess a feedback mechanism to adjust factor weightings over time as experience accumulates.
2. The credit assessment framework determines which risk factors pertain to the lending decision within the context of each borrower's situation, and the loan product parameters, and appropriately adjusts the factor weightings to produce the right outcome. This is in stark contrast to credit scoring, which has a fixed number of factors that have a constant set of point weightings that are automatically applied to every credit applicant regardless of their qualifications. Furthermore, the credit assessment framework uses a forward-looking approach and simulates future economic conditions, and its adaptive nature makes it more, not less, predictive over time, unlike credit scoring models.
3. The credit assessment framework systematically integrates judgmental components and proper context into the modeling process in a complete and transparent manner. Credit scoring systems lack context because they rely purely on the available data to determine what factors are considered. Credit scoring systems lack transparency because two individuals having the identical credit score can be vastly different in their overall qualifications, the credit score itself is not readily interpretable, and industry credit scoring models are maintained as proprietary, as are their development processes.

Additionally, the credit assessment framework can be configured to improve the borrowers' financial literacy, the lenders' process of transparency, and to better assess loan product affordability and suitability through the following aspects:

1. Comprehensible classification to convey the essence of the borrower's qualifications: this allows risk rating credit transactions within that complete context, including transaction and borrower contours. This fosters financial education and literacy by letting the borrower know how he/she is classified and ranked according to relevant causally linked primary factors and also how their proposed loan is classified versus other possible loans for which they would be qualified.
2. Greater control of loan decisions: this is through its ability to integrate expert judgment with statistically based criteria in the risk evaluation process, which encompasses not only default risk, but also concentration risk, fair lending non-compliance risk, and a host of other important objectives. Specific thresholds can be enforced at the segment level to limit risk exposure. As a result, significant overstatement or understatement of risk on individual loan transactions can be avoided, as can unacceptable levels of risk across all portfolio segment levels.
3. Easy identification of loans that are truly affordable relative to every borrower segment: this drives product offering choices relative to specific credit risk segments. The most suitable mortgage products will vary widely by segment and they may not be the most profitable choices for the bank nor the most inexpensive choices for the consumer. This facilitates responsible lending in the aftermath of the sub-prime mortgage crisis, and it pertains to Alt-A and prime markets as well. In addition, there may be a positive net effect for fair lending performance relative to product steering.

BRIEF DESCRIPTION OF THE DRAWINGS

FIG. 7 is a table providing a comparison between a comprehensive assessment framework approach and a previous underwriting model approach.

FIG. 8 depicts a payment history dimension showing ratings for three categories of trade lines.

FIG. 9 depicts a payment history rating collapsing on time and trade line categories.

FIG. 10 depicts an example of home purchase mortgage loan primary factors for a 30 year fixed rate mortgage.

FIG. 11 depicts home purchase mortgage loan primary factors for a 5 year ARM.

FIG. 12 depicts a chart showing identical handles for a 30 year fixed rate mortgage and a 5 year ARM.

FIG. 13 depicts secondary factors (e.g. weights of 5-15 percent each in a final decision).

FIG. 14 depicts a two-stage action table for a mortgage loan example.

DETAILED DESCRIPTION

Figure 1:
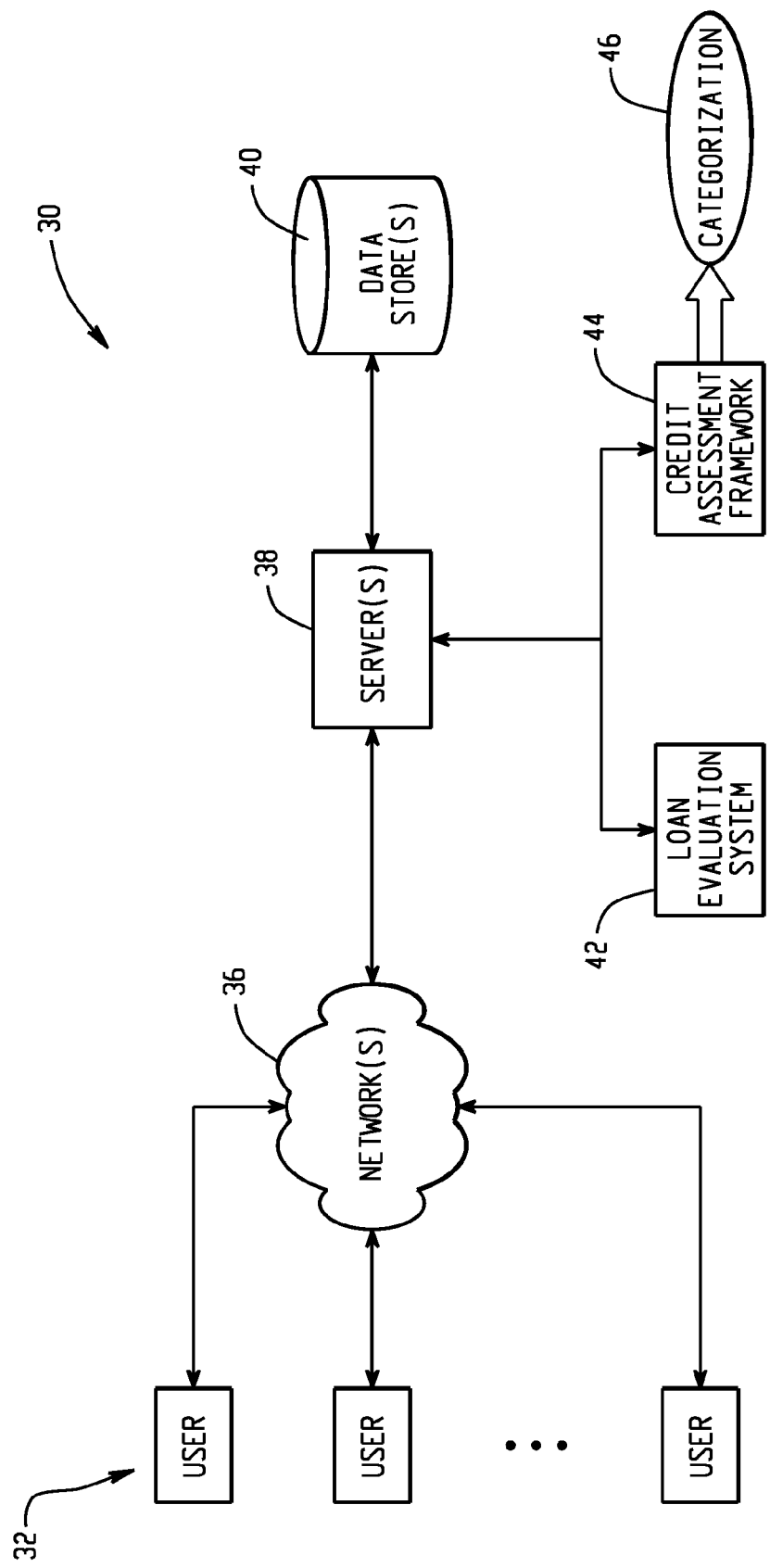
FIGS. 1 and 2 are block diagrams depicting environments wherein users can interact with a loan evaluation system.

FIG. 1 depicts at 30 a computer-implemented environment for evaluating loan applications for business and consumer lending. The environment 30 allows users 32 to process loan applications through a loan evaluation system 42. The users 32 can interact with the system 42 through a number of ways, such as over one or more networks 36. Server(s) 38 accessible through the network(s) 36 can host the system 42. The loan evaluation system 42 receives information about a loan application from the users 32 and/or from data which is already stored in one or more data stores 40 (e.g., databases). To facilitate processing a loan application, the loan evaluation system 42 includes or has access to a credit assessment framework 44.

The credit assessment framework 44 is a loan rating system that extends existing credit scoring to embrace many or all relevant factors and business context so that lenders can classify credit risk and decision all transactions in a more, effective, transparent, and forward-looking manner. This enables lenders to improve their monitoring and management of loan portfolios. The credit assessment framework 44 can also enhance fair access to credit and ensure suitable loan products for borrowers. In terms of financial disclosure, the credit assessment framework 44 provides borrowers with their categorization 46 relative to all primary underwriting factors.

Figure 2:
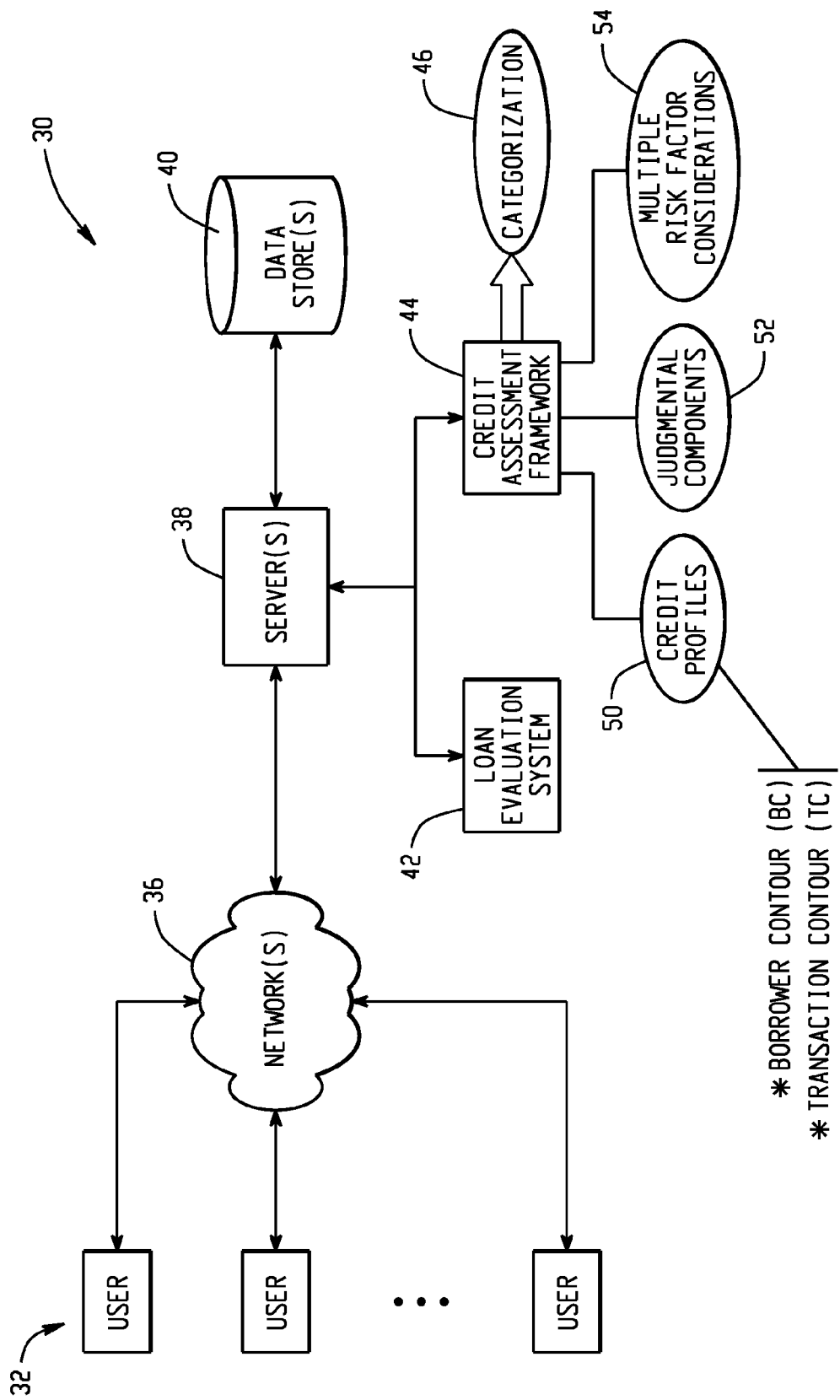

With reference to FIG. 2, credit profiles 50 can be used when generating the categorization 46. Based upon a credit profile, a borrower is placed into a segment and actions can be assigned for each segment. These can include approval/denial, price, and terms.

The credit assessment framework 44 provides borrowers with their categorization 46 relative to all primary underwriting factors (e.g., classification of borrowers and loans relative to major categories of factors linked to loan default risk for quantifying risk) via a transaction contour identifier. With this single number, strengths and weaknesses relative to the primary qualification criteria are immediately apparent. It avoids substituting payment habit and loan preference history factors as proxies for debt ratio and income, net worth, liquid reserves, and payment shock since they are clearly out-of-context relative to the broad categories of capacity and capital. In addition, a 1-10 rating scale (or other type of scale to facilitate the understanding of the rating) can be used to describe the overall credit rating when all factors are combined. This rating is the same for all borrowers sharing the identical transaction contour.

Credit profiles 50 can include not only transaction contour data, but also a borrower contour as follows. In the credit assessment framework 44, a borrower contour is a distinctive pattern of values relating to character, capacity, and capital for a consumer or business. Each distinctive pattern is identified by a unique borrower counter handle. Character includes payment history, savings history, stability measures such as years in profession, etc. Capacity is measured by such factors as income, debt obligations, cash obligations, living expenses, number of dependents, etc. Capital includes such factors as net worth, amount and liquidity of assets, etc.

In contrast, a transaction contour is based on all five "C's" of credit pertaining to a particular obligation. A transaction contour can accommodate changes in economic or business factors, such as the value of the underlying asset being financed, or the collateral pledged, for a secured loan transaction. For example, in the case of a mortgage, property reappraisal may result in a different loan-to-value (LTV) that can change the transaction contour value. Another example would be a borrower's working capital position, which may change due to assets being marked to market, or possibly due to longer term asset liquidations.

The credit assessment framework 44 can also include a systematic judgmental system which uses judgmental components 52 to overcome traditional judgmental system's limitations associated with consistency and efficiency. As examples of judgmental components, business context, economic factors, and other related factors can be integrated with a modeling process using a handle-based segmentation approach. A systematic judgmental system can readily simulate or predict risk profile based on the handle structure using various modeling methods. It also provides a natural grouping of credit risk. This facilitates testing and validation, and is more realistic and actionable. For instance, a systematic judgmental system can also do the same based on the handle cell ordering using actual data. Systems can then be assessed to some degree by logical comparisons to identify disconnects whereby the data indicates one cell is riskier when, in fact, it is clearly less creditworthy by logical and accepted standards.

As shown at 54, a credit assessment framework 44 can also include multiple risk factor considerations. For example, unlike current credit scoring, which considers underwriting factors individually, the credit assessment framework 44 can simultaneously consider all relevant risk factors and its primary factors have a direct bearing on loan performance. This can also include using forward-looking techniques, such as simulating future economic conditions (e.g., future economic state or financial scenarios involving the borrower), which allows the loan approval process to consider more than only past credit history.

Figure 3:
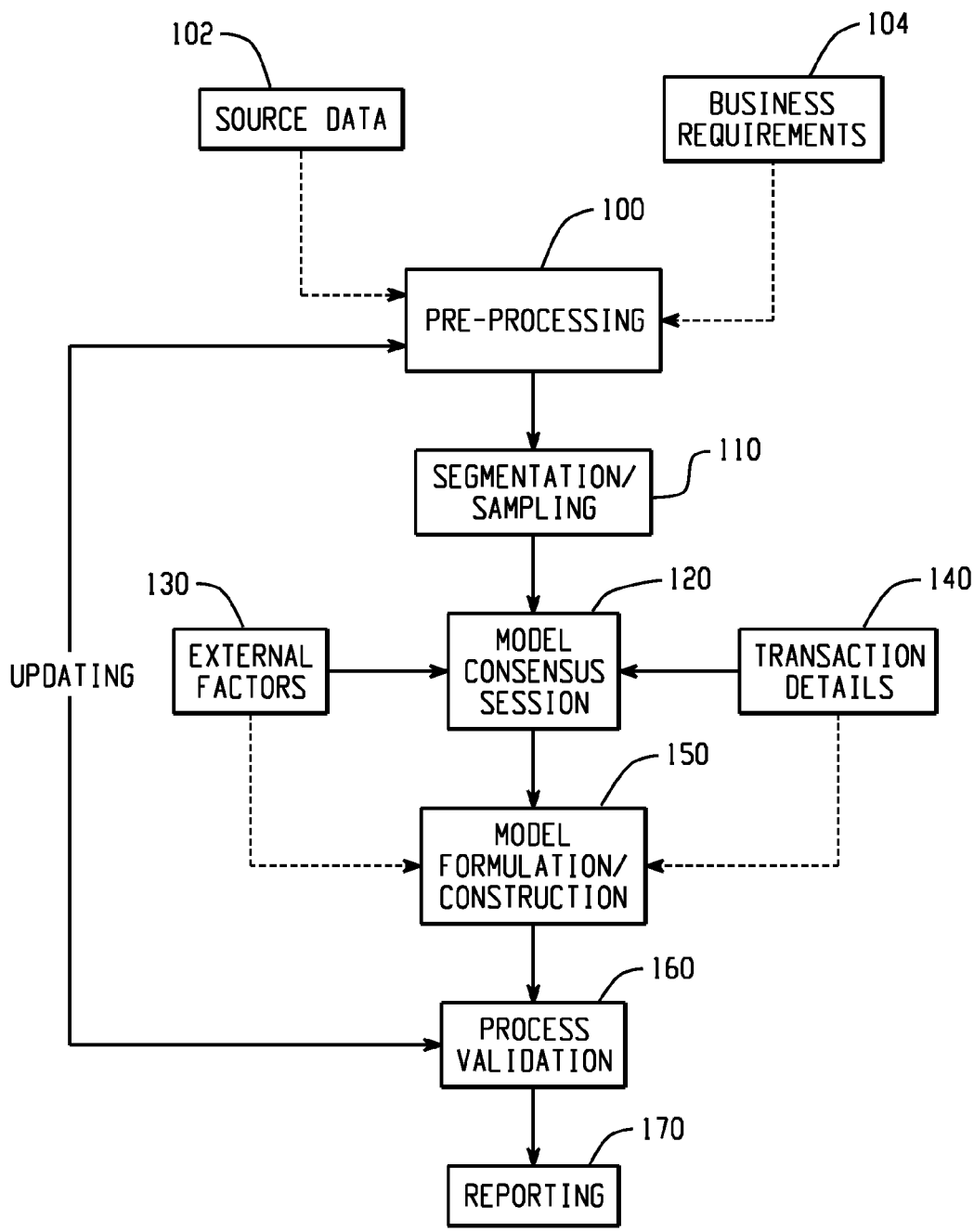
FIG. 3 is a process flow diagram depicting steps related to development of a credit assessment framework.

FIG. 3 describes the overall credit assessment framework process. As is the case with typical loan approval system development using the standard credit scoring approach, requisite loan data, product data, policies, and business requirements is sourced and pre-processed at process 100 so as to create a base of information that is sufficient for system construction.

Process 100 identifies source data 102 and business requirements 104. Because the credit assessment framework can be used for different purposes such as managing credit risk or fostering profitable growth, preparation of data involves defining project scope, determining availability of information, and capturing current underwriting practices. The outputs from process 100 will be used as inputs for sampling, segmentation, and model formulation.

As an example, data that is important for estimating loan default for consumers would include, but not be limited to, 1) an inventory of all current obligation terms, balances and monthly payment amounts with all lenders, service providers, landlords, insurers, and counterparties, 2) current sources of income and time in profession and with current employer, 3) liquidity and value of personal assets and net worth, 4) nature, and value of collateral (or asset being financed) based upon both current appraisal and future value ranges, and the amount/percent of loan down-payment (or loan-to-value ratio), 5) payment and delinquency history for credit and non-credit obligations and any past loan defaults, 6) insurance coverage by type, including policy limits and cash values, and 7) loan conditions including maturity, loan amount, pricing mechanism, payment schedule and terms, and other borrower elected or lender-specific transaction requirements.

Process 110 involves sampling and is used where missing, or too little, data can cause observations to be disproportionately excluded for certain population segments, which can result in a biased sample and unintended results. Time intervals over which samples are drawn may, or may not, reflect current conditions and hence models based on data from non-representative time periods can also be misleading. Sampling and segmentation go hand-in-hand. Segmentation can be used to account for a variety of structural differences in a sampled population, such as demographic differences, economic differences, product differences, channel differences, or differences in customer culture or lifestyles.

The model consensus session process 120 (MCS) is a mechanism whereby the credit assessment framework ensures that classification of credit transactions is performed sensibly and comprehensively. Expert judgment, proven credit principles, and product and loan policy information are used, in addition to the available historical loan application and performance data. The resulting categorization is called a transaction contour (TC). Also, a borrower contour (BC) can be used which transcends all financial transactions for a particular borrower.

Next, external factors 130 relating to the economy, market states, and underlying asset valuation and transaction details 140 are combined by process 120 using a variety of modeling methods to determine via process 150 a loan decision model in the form of an action table, which specifies an approve decline decision for all borrowers relative to the credit transaction contour. In addition to the action table, a series of additional tables are generated that allow for the maintenance and monitoring of the action table.

A comprehensive and transparent validation process 160 is used to increase trust and confidence that comes from knowing exactly how loans are evaluated and how credit quality and credit access will be maintained and improved. This step involves an examination and interpretation of underwriting model inputs, processing, and outputs. The credit assessment framework can be validated from both a qualitative and quantitative basis and monitored for any signs of predictive decay or compliance violations ensures that it will perform at least as well as expected relative to credit risk measurement, responsible lending, and fair lending.

Process 170 produces various loan underwriting operational reports, such as multidimensional acceptee population mix reports and multidimensional acceptance rates tables associated with the current action table. In addition, alternative action tables associated with specific credit policy and marketing strategies can be produced, along with their system maintenance and operational reports. Because these reports can be regenerated and compared at two points in time, multidimensional variance reports can be produced that help spot issues early on in great detail using the TC as a basic frame of reference, and several such reports may be generated and visualized graphically to easily identify trends.

The end result of the credit assessment framework is a more flexible and adaptable lending system that can accurately evaluate credits, quantify transaction risk, maintain appropriate risk levels based on policy-dictated risk tolerances, and more effectively provide information to monitor and manage loan portfolios. The credit assessment framework provides fair access to credit and ensures suitable loan products for consumers, and a more profitable, safe, and sound loan portfolio for lenders.

The following provides an example of the model consensus session process 120. Credit scoring models are based on observed good/bad performance for a set period of time. If the observation window is the past 4-5 years when times are good for the economy, interest rates are falling, etc. then the information weights of evidence may not be a good indicator of how future loans will perform based on their scores if the reverse is true, e.g. a recession with rising interest rates, etc. The weights of a hybrid model, in contrast, are tempered by logic and proven judgment. The argument that statistical credit model factor point assignments do not make sense, when viewed in isolation, can lead to the failure to detect the impact of shifting assumptions and givens. A common consumer complaint relative to credit scores is that is takes a long time for their scores to improve—typically the performance window for past due payments is 24 months. The credit assessment framework, in contrast immediately recognizes changes in creditworthiness. For example, if one has an inheritance, or bonus, or their capital position changes significantly, their credit contour immediately changes. The same would be true if they experienced a change in capacity. Also, with additional sources of information, their satisfactory trade line information can be bolstered, which will be explained in the next section on alternative data.

By way of a model consensus session process 120 (MCS), the credit assessment framework affords a complete credit categorization of borrowers prior to risk rating them, unlike most of the prevailing approaches today, which are piecemeal and risk rate certain aspects of borrower creditworthiness. In contrast, the credit assessment framework adopts a more holistic view, drawing upon the well known Five C's of Credit. The primary factors to encompass the first three C's of Credit can be extended to create a Borrower Contour (BC), which is a distinctive pattern of values relating to character, capacity, and capital for a consumer or business. We can further introduce the notion of a lending transaction contour (TC), which is based on all five C's of Credit pertaining to a particular obligation. TC is a distinctive pattern of values relating to character, capacity, capital, collateral, and conditions for a consumer or business. TC can encompass BC, or it can operate across segments defined by BC. TC may also encompass channel and market factors. Both TC and BC indicators are included in each loan application and origination record. This enables a comprehensive view of credit risk. As a result, lenders can evaluate and monitor lending practices to identify subprime credit deterioration, and potential predatory or discriminatory issues. In terms of financial disclosure, the credit assessment framework provides consumers with their categorization relative to all primary underwriting factors via a transaction contour identifier. With this single number, strengths and weaknesses relative to the primary qualification criteria are immediately apparent. In addition, a simplified 1-10 rating scale is used to describe the overall credit rating when all factors are combined. This rating is the same for all consumers sharing the identical transaction contour.

To illustrate, we draw upon an example based loosely upon the way that credit bureau scoring is segmented in the United States. That scheme includes a combination of the extensiveness of the credit record (no/thin file, moderate file, or thick file) and the payment performance (good, mild delinquency, severe delinquency). In this case, the borrowers are grouped into distinct combinations, each having a distinct credit scoring model. This segmentation, unfortunately, does not reflect comprehensively the borrower's ability to repay their debts.

Figure 4:
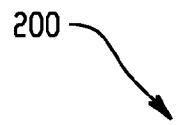
FIG. 4 is a table depicting segment handle specifications.

In contrast, the credit assessment framework utilizes the borrower contour based upon character, capacity, and capital in order to create a credit contour having twelve possible patterns, as shown at 200 in FIG. 4, based upon:

Capacity (Income+Debt Ratio):(High/Low)
Capital (Liquid Reserves+Percent Down-payment):(High/Low)
Payment Performance (Credit+Non-Credit):(Good/Fair/Poor)

Each of the primary categories is then assigned specific rating classifications based on factors causally related to them. For example, borrower capacity may be assessed by such factors as income, debt-to-income ratio (DTI), payment-to-income ratio (PTI), etc. In the simple case where just DTI is used, then a threshold value would be determined, perhaps 40%, to separate borrowers possessing high capacity from those having low capacity. This process would be repeated for the character and capital categories. The final step is to assign judgment-based, or empirically-based, ratings to each of the twelve unique segments (i.e. 1—Low, 2—Moderate, 3—High, 4—Severe), as indicated in FIG. 4.

Within each segment, borrowers would be homogenous relative to primary credit strength. Lenders might regulate which products/programs would be available within the segments based upon affordability concerns. The BC segments can be used to determine which products may be appropriate for certain groups of borrowers. For example, borrowers with little capital or capacity may not qualify for variable rate loans. Moreover, portfolio risk concentration/exposure limits could be managed at the segment level using a referencing scheme known as a segment handle. After a certain frequency threshold is achieved, offerings could be restricted in a given segment. Using this approach, vulnerability metrics are applied to rank-order which cells will perform better under differing economic scenarios (e.g. housing slump, rising interest rates, etc.).

In addition to current financial ratios, future financial ratios, in addition to current financial ratios, are of key importance for certain types of loans, such as ARM and Option-Based mortgages. To do that, behavioral and historical variables may be used to capture more than a snapshot, e.g. current income and income 12 and 24 months ago averaged to calculate average annual increase in the denominator for debt-to-income (DTI) projection for an ARM reset date, where the maximum rate on the reset date is also assumed. Yet another example would be property valuation using best case, worst case, most likely to come up with a future valuation of the asset's current price, less one standard deviation, and a conservative future value for the loan-to-value (LTV) calculation on an ARM.

As an example of process 150 in FIG. 3, the following illustrates integrating business scenarios into analytical models. More specifically, this example addresses model construction and formulation components of the gap. In this stage, segmentation results including TC or BC will be integrated with proper business context or external factors relating to the economy, market states, and underlying asset valuation to fine tune model specifications. As a result of segmentation performed in the previous stage, this modeling process is significantly simplified. For example, when modeling with logistic regressions, each TC or BC will naturally correspond to a unique covariate pattern associated with a probability of default. The TC can accommodate changes in economic or business factors, such as the value of the underlying asset being financed, or the collateral pledged, for a secured loan transaction. For example, in the case of a mortgage, property reappraisal may result in a different LTV that can change the TC value. Another example would be a borrower's working capital position, which may change due to assets being marked to market, or possibly due to longer term asset liquidations.

Specifically, this process is accomplished through a dynamic conditional process, in which the impact of business context or external factors is associated with each TC or BC to create conditional and interactive structure for model specifications. This is completed in two steps and is adaptive at different levels. Step one is to enumerate and separately consider all possible combinations of the primary variables. The actions taken in step two would depend upon how the borrower was initially classified according to the primary credit risk factors. To illustrate with a mortgage example, consider how one might appropriately decide what weight to apply on a value for the factor debt-to-income ratio (DTI) based on knowledge of the loan-to-value ratio (LTV). Consider the following three scenarios:

1) Suppose you know that LTV is 20%, so that the customer has an 80% equity stake in the property being financed. Knowing this fact, how would you weigh the importance of DTI? How would you rate the following values of DTI, relative to risk in this case:

DTI=20%? DTI=40%? DTI=60%?

2) Next, suppose you know that LTV is 70%, so that the customer has a 30% equity stake in the property being financed. How would you rate the following values of DTI, relative to risk in this case:

DTI=20%? DTI=40%? DTI=60%?

3) Finally, suppose you know that LTV is 100%, so that the customer has no equity stake in the property being financed. Again, how would you rate the following values of DTI:

DTI=20%? DTI=40%? DTI=60%?

The foregoing scenarios could be repeated holding the value of DTI constant and then varying the values of LTV under different scenarios. The point is that if you have a different weighting of one variable based on the value of another then the alternative approach should make business sense. This is achieved with a transparent model validation process as detailed in the next session.

The following provides an example of the updating and validation process 160 of FIG. 3. A lender should continuously improve model predictability over time as information accumulates to maintain, or improve, the accuracy of the risk measurement system. For most lenders, this translates to a constant burden of scorecard redevelopment every two years or so. Constant redevelopment of scoring models is very resource-intensive. When the sample used is drawn during times of economic change, or transition, the future results of the scorecard produced can significantly vary from those of the holdout sample used to validate, and back-test the system. This is because bad credit payment behavior correlations change relative to the scorecard factors when new economic and demographic circumstances present themselves. In these cases, scorecard validation may not immediately surface the problem, and when the issues do become apparent, the scorecard will likely need to be replaced earlier than expected. Even then, the same sample issue can persist, and the cycle may repeat itself.

Figure 5:
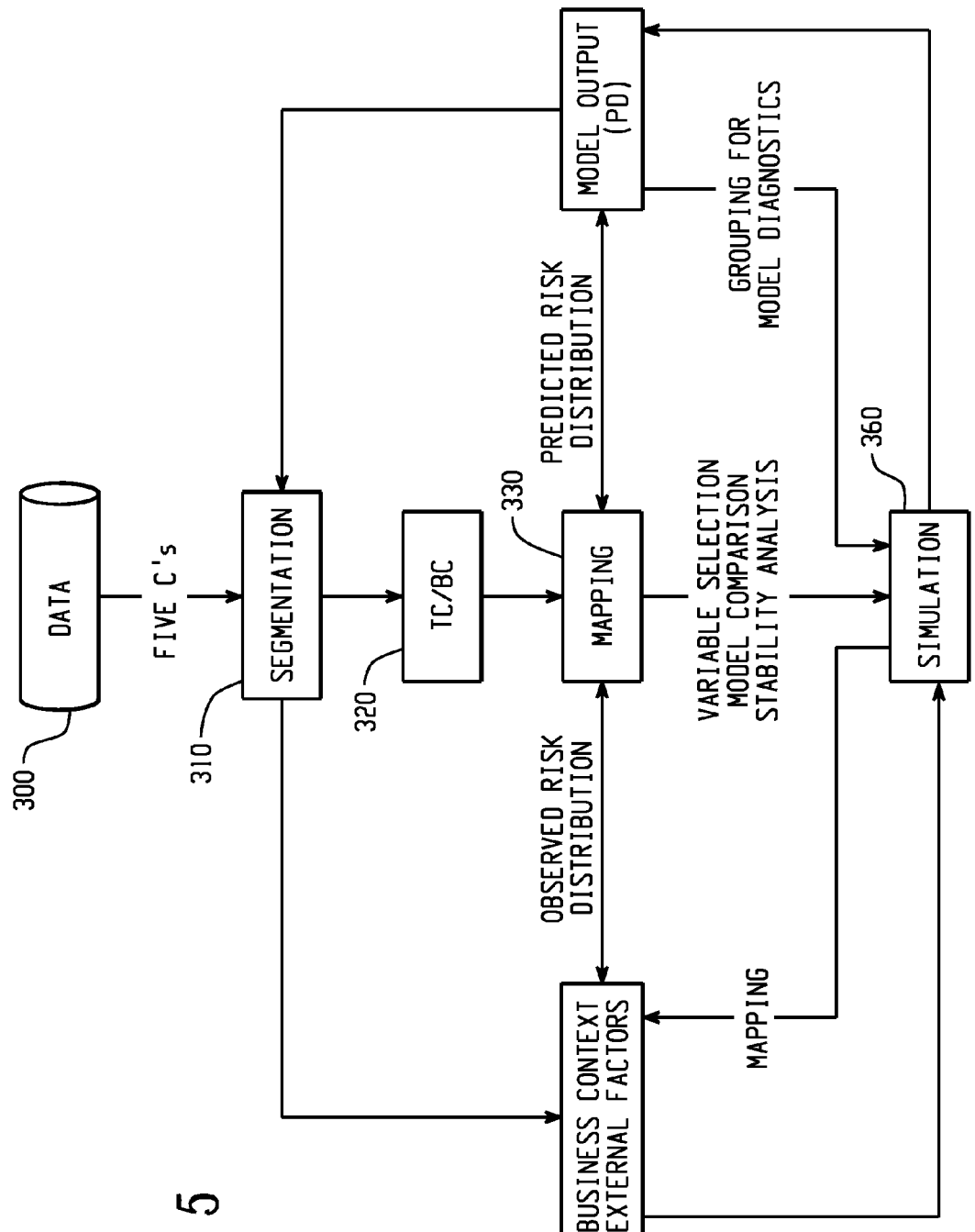
FIG. 5 is a process flow diagram depicting steps related to model validation.

In the credit assessment framework, process validation is integrated into the entire framework as shown in FIG. 5. The expected frequencies of credit applicants and the weights associated with the credit assessment framework factors, by primary factor segment, are updated dynamically as information becomes available. It allows for in-depth analysis of all possible multi-way primary factor comparisons relative to the mix of accepted applicants and also acceptance rates at any point in time. Because the credit segments are immediately interpretable and comparable to one another relative to credit risk, the credit assessment framework validation affords an additional measure of transparency and confidence that non-intuitive patterns can be detected, investigated, and remedied early on to head off unwanted consequences. This also presents a cost-effective approach to monitor and validate the consistency of risk rating system for the banks that want to implement, or already use, Basel II's Internal Rating Based Approach.

FIG. 5 depicts a validation process, which can be described as follows:

1. Create segment handle structure 320 at 310 for input data 300 if needed. When the system being validated is either pure judgmental, or credit scoring, an MCS is used to create the corresponding handle cells. The same approach can be used to segment model output associated with the probability of default.

2. Associate model output at process 330 with model input with handle structure. In this step, model results are analyzed by handle cells together with constructed business scenarios. At a minimum, rank orderings of the TC are verified both empirically and through expert judgment, and risk estimates are tested for validity using both holdout, and out-of-time, credit observations based upon availability.

3. Compute the residual score points for secondary factors, together with the system cut-off, and establish a "base" qualification rule within each cell. The residual between the predicted risk score and the input risk distribution (or profile) are further analyzed at 330 for root causes. In addition, outliers, or applicants that do not belong to that handle cell are identified and tested to determine how removing these outliers can improve model fit and reduce residual. This also can be performed to some degree by logical comparisons to identify disconnections between the observed risk and the predicted risk. For a concrete example, suppose a hybrid model shows handle cell 2 has an observed probability of default that is somewhat higher than predicted, and it's observed ranking is higher risk than handle cell 3, which is identical to it in all respects except that cell 3 has a poor, instead of fair credit history rating. In such a case, the higher than expected observed probability of default for handle cell 2 would be questioned because it was not only inconsistent with model predictions, but also because, all else being equal, applicants with poor credit histories should be riskier than those having fair credit histories.

4. Analyze declined applications, including inferences about how the declines would have performed had they been accepted. If the system is a hybrid, then the process is streamlined, and the only basis for analysis of declined applicants would be system overrides. This allows a direct comparison between the observed risk in input data and the predicted risk in model outputs, and if necessary, embed class priors by utilizing different thresholds and business policy. This, to a certain degree, overcomes the common weakness associated with the standard validation metrics, and allows more accurate, and explicit, testing of model discriminatory power. In addition, the handle method creates a natural grouping definition for statistical testing and its effectiveness does not depend on binning.

5. Perform simulation at process 360 and optimize handle structure. This is achieved by using variance reduction techniques to obtain maximum homogeneity in each handle segment. Simulation results from this step are also used to enhance lending policy rules.

Another point is that the validation process is performed from both credit risk and compliance perspectives aided by an optimization process. The objective function is constructed based on results from 1 and 2. The goal is to select optimal thresholds to maximize model predictability for "good versus bad" performance, or to minimize disparate impact on all relative constituencies, subject to a set of constraints that encompass constraints on both regulatory compliance and business requirements. A risk quadrants plot is used to balance the trade-offs between compliance risk and credit risk. The outputs from this optimization process can help banks make decisions on model update or rebuilding activities. A detailed example of the mathematical representation of the type of model compliance constraints which can be used in this context has been provided in the literature.

The connection between credit underwriting gaps and fair lending becomes more apparent when one attempts to balance credit access and credit risk in a more holistic framework as described. Fair lending self-evaluation normally entails systematic compliance testing for different outcomes (e.g. loan product selection, loan approval or denial, loan price) based on how loans are decisioned, but not necessarily based on who is actually most qualified. When significant findings persist, the final analysis involves construction of sets of similarly situated borrowers in different protected classes that can be compared with one another. It is possible that even if borrowers are treated consistently by the underwriting system, individual matched-pair cases can be found where more qualified borrowers are disfavored over less qualified counterparts. In such instances, this may, or may not, involve protected vs. non-protected class differences, i.e. the differences may occur "in-class" as well. In situations where there is a difference in distribution for the protected and non-protected classes relative to the comprehensive credit assessment framework segmentation and if those segments fall into "underwriting gap" categories, then the results will signal potential discrimination. In summary, adoption of the credit assessment framework allows for improved credit default estimation, better identification of predatory lending patterns, the ability to assess whether predatory lending patterns cross over to fair lending problems, and immediate isolation of unfair lending patterns occurring within the homogenous risk classifications. This has implications for avoiding predatory and fair lending problems through predictive analytical approaches and optimization relative to the credit assessment framework handle structure.

Figure 6:
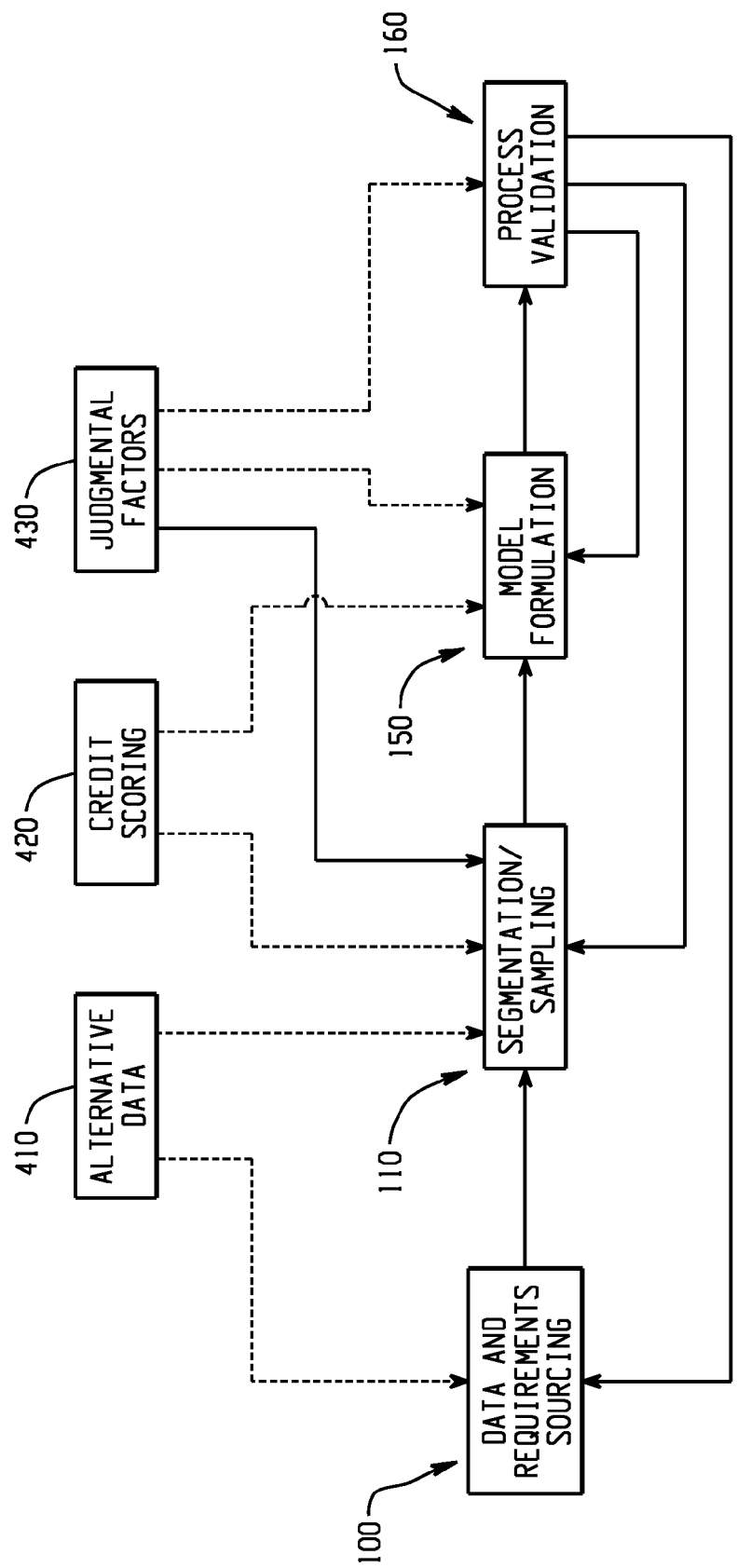
FIG. 6 is a block diagram depicting the interplay of alternative data, credit scoring, and judgmental factors.

FIG. 6 illustrates how the credit assessment framework can utilize alternative data, credit scoring, and judgmental components to improve efficiency, transparency, and accuracy. We now briefly describe how these elements relate to the four development milestones.

Judgmental factors 430 play a role throughout the credit assessment framework development process. In fact, the credit assessment framework can be considered as a "systematic" judgmental decision process that can be fully automated and updated after initial judgmental factors 430 are integrated. Since it can be executed in a similar automated fashion as credit scoring, it can overcome some shortcomings inherent with traditional judgmental systems, and provide fast, consistent, and efficient credit assessment. This can be crucial in the context of most consumer and some small business loans, and also for segmenting and monitoring micro-loans to lower origination and servicing costs and better price the risk.

The credit assessment framework is not an expert system. Like credit scoring it treats everyone consistently. It is very flexible. It can be based on pure science, pure judgment (initially), or a combination of both. Judgment is not performed by the credit assessment framework based on individual opinions, as was the case prior to the age of credit scoring. Judgment is carefully and systematically deployed through consistent business rules that have stood the test of time in the larger sense, and also better fit the evolving nature of today's business climate than a static and inflexible empirically based scorecard, that diminishes in effectiveness from the day it is put into use. The question of protected class treatment is a complex one. The credit assessment framework provides greater transparency than credit scoring or application scoring processes. If minorities are disadvantaged in any way, the credit assessment framework can better detect it and also can correct for it more effectively and precisely than any other method in use today. Furthermore, relative to Regulation B issue Section 202.P.iii, the credit assessment framework can be developed, like credit scoring models, on a data-driven basis. The fact is that the credit scoring development process itself entails a host of judgmental decisions and has always been recognized by practitioners as being both an art, as well as a science. In some cases the flavor of statistical methods used may differ, but that is of no consequence. In fact, the credit assessment framework may be based on a more general class of discrete multivariate models than the standard credit scoring regression models, and they are in many cases mathematically equivalent depending upon how the developer chooses to formulate the decision model. Even if a credit assessment framework system is developed using factors having purely judgmental-based weightings that are applied universally, it should still fall into the statistical model category. An example might be quality of management for a small business loan. If there are well defined descriptions of what constitutes strong (value of 3), fair (value of 2), or weak (value of 1) management based on objective criteria such as years of experience, education, track record, etc., then these numerical ratings can be treated as data just the same as with any other model factor. Customer relationship is another such factor, which may depend on the length, depth, and breadth of the loans, deposits, and services a banking customer has with a particular financial institution. Again, business rules would be used to determine the value rating for customer relationship in the underwriting model.

From a modeling perspective, the credit assessment framework approach does more than simply introduce judgmental factors 430 into the modeling process. This provides the simultaneous consideration of all relevant factors via the handle cell. This allows for both a conditional structure and interaction effects that scorecards simply cannot capture with their "one-size fits all" assignment of points. It can also perform the standard risk grouping and ranking of handle cells using actual data. This way, the credit assessment framework affords greater control of loan decisioning through its ability to integrate expert judgment with statistically based criteria in the risk evaluation process, which encompasses not only default risk, but also concentration risk, fair lending noncompliance risk, and a host of other important objectives. In this way, the credit assessment framework loan decisioning is not restricted to a numerical score cut-off, which must be overridden from time-to-time. By systematically integrating judgmental elements, the credit assessment framework is in fact more consistent than credit scoring because it can greatly minimize, or eliminate entirely, system overrides. For example, in practice, with credit scoring, low side override rates can approach 5% and high side override rates can approach 10%. For hybrid systems, the number of overrides can be less than 0.5 percent.

With respect to alternative data 410 on FIG. 6, the information value contained in alternative data and community data has made it increasingly apparent that significant ground can, and must, be gained in enhancing the state-of-the-art in consumer and small business lending relative to those segments in particular, and perhaps for all borrowers in general. The use and understanding of IT for credit decisioning has developed so rapidly that few difficult barriers remain to spreading this financial innovation to non-credit economic transaction data and to most countries around the world. There are a number of benefits to the use of non-financial economic transaction data. Mainly, with use of non-credit transaction data, vast numbers of consumers can be brought into the financial mainstream and gain access to credit. With greater information, lending decisions become better, with lower rates of delinquencies, less overextension, and an increase in the number of performing loans. This will shore up data gaps in the credit evaluation process, especially relative to payment history for non-credit obligations and borrower capacity.

Alternative data 410 can be readily fed into the credit assessment framework's handle structure for the purse of segmentation and modeling. Without changing any model factors, one can incorporate non-credit trade lines into the set of credit trade lines usually considered for payment history. In this way, the credit factor "number of times 30-days past due" will be calculated identically, because it will simply include counts from the non-credit trade lines. Similarly, the factor "number of satisfactory trade lines at least 24 months old" would be calculated the same, only now it would include non-credit trade lines as input to the calculation. For more detailed examples on how alternative data are used for loan underwriting.

As shown in FIG. 6, credit scoring 420 can be mainly used to assist segmentation and model formulation. For example, credit score could summarize payment performance for both credit and non-credit trade lines. However, the credit assessment framework can extend credit scoring from three perspectives. First, the credit assessment framework ensures inclusion of primary predictive factors that cover the full spectrum of relevant qualification criteria, and both determines, and reveals, how they combine, to produce outcomes. Credit scoring, which relies on historical data, does not have this capability, nor does it possess a feedback mechanism to adjust factor weightings over time as experience accumulates (e.g. credit scoring is not adaptive, rather its predictive strength diminishes over time). Even when credit scoring systems are re-developed the factors are again considered one at a time and selected in a particular sequence.

Second, the credit assessment framework uses a dynamic conditional process (DCP) in modeling decision factors. In model building there is always the dilemma of what factors to include and how much weight to put on them individually. This is complicated by the reality that many credit factors are correlated with one another. The simple fact is that the primary underwriting factors possess deep interrelationships and, as such, their interactions and conditional nature should be reflected in the model formulation to the greatest extent possible. The selection of factors for scorecards does not require that all primary factors be considered, and often they focus on payment history, search for credit, and type/mix of credit used and ignore factors that have a direct relationship to ability to repay the loan, such as capacity and capital. When included, factors relating to capacity, capital, collateral and conditions, or some combination of them, are often applied serially after a credit score is produced, and those factors are usually considered as distinct and independent overlays (sometimes two, or at most three factors are considered jointly for risk-based pricing adjustments to mortgage points). The result can be a series of adjustments that can mount up to large incremental pricing offsets. With the credit assessment framework, one can maximize the breadth of candidate model factors, which results in greater inclusiveness and accuracy. In addition, factor definitions may be tailored in order to maximize the information value of the data.

Third, the credit assessment framework integrates business context with the modeling process in a complete and transparent manner. Current credit scoring systems lack transparency as industry models are maintained as proprietary property of the companies that develop the scorecards and those that gather and report credit data and credit scores, which are simply a numerical rating. the credit assessment framework uses the BC to convey transparency and the essence of the borrower's qualifications. As the credit assessment framework rates credit transactions within the context of the TC, it can help avoid significant overstatement or understatement of risk on individual loan transactions.

Simply put, the credit assessment framework shores up the gaps in today's prevailing loan decision processing. It accomplishes this via a complete credit categorization of borrowers prior to risk rating them, unlike current approaches which are piecemeal and risk rate certain aspects of borrower creditworthiness. FIG. 7 provides a side-by-side comparison that highlights the most common shortcomings of today's underwriting models and their corresponding remedies provided by the credit assessment framework.

While this summary is a generalization and simplification, it does convey differences which we view as needed improvements in the way underwriting systems should work. There are obvious crossover effects between the Five C's, such as the notion that the risk associated with a loan having undocumented income (Capacity) can adequately be quantified and priced for a subprime option-type mortgage (Conditions), or that there are reserves (Capital) that can be tapped if necessary in the future due to rising property valuations (Collateral). The subprime mortgage crisis, and spill-over effect to prime mortgage loans, can be traced to many of the shortcomings summarized here and to combined assumptions across key underwriting factors.

The systems and methods disclosed herein can be used in many different types of applications. For example, the following credit assessment framework example is for home purchase mortgages originated through a lender's branch retail channel. Models for refinancings or home improvement loans would have differing sets of criteria, as would wholesale channel mortgages. As an illustration, FIG. 8 shows an example of capturing payment history for three categories of trade lines. the payment history, or "character" dimension of the five C's of credit. FIG. 9 shows how payment history rating can be collapsed based on time and trade line categories. As one might expect, payment history is a primary underwriting factor in mortgage lending and includes delinquent or derogatory performance, and the typical credit trade lines have been expanded to include alternative data trade lines.

Continuing with our example, FIGS. 10 and 11 provide primary factors for a home purchase mortgage and FIG. 12 shows the corresponding handle structure for both a 30-year fixed rate mortgage and a five-year adjustable rate mortgage (ARM).

Examples of secondary factors are shown in FIG. 13. The current subprime crisis has seen certain loan products villianized, such as low, or no, documentation loans, option-adjustable priced mortgages, interest only ARMs, 40 year mortgages, etc. In the case of some of the variations on adjustable rate mortgages, the issue is more with how those products were administered than the products themselves. A five year ARM may make sense for borrowers having a strong capital position and adequate reserves. Borrowers lacking strong capital, but who have strong capacity may still be good candidates, if they have a strong savings rate and they agree to build an adequate reserve over time to immunize themselves against the imbedded interest rate risk in their ARM (see last example listed in secondary factors).

The primary factors and secondary factors are combined to render a loan-underwriting decision. FIG. 14 specifies the two-stage action table for this example. There are 36 primary handle cells based on the handle dimensions.

It is necessary that every handle cell relationship to secondary factors be defined, even if the definition specifies approve or decline with no secondary factors required, or a general rule such as any two secondary factors with good (G) ratings. A more in-depth discussion of how the secondary factors would be applied to the primary factor combinations (handle cells) for a similar example can be found in the literature.

Note that in this particular example the primary (stage 1) factors are identical, with identical actions, but the stage 2 factors will not be the same for a 30 year fixed rate mortgages versus the 5 year ARM.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting. As an illustration, a system and method can be configured to handle a number of different situations, such as the following:

Intervention

A primary contributory factor to the current subprime crisis was the failure of current lender underwriting practices to take into account all relevant risk factors that would have effectively signaled borrower vulnerability to the payment shock associated with adjustable rate or option-priced mortgage loans. In other words, a loan that looks good today is in reality a "credit time bomb." While these innovative loan products create some additional risks, they are not the cause of the problem, and they may represent the best alternative for certain segments of qualified borrowers.

For example, suppose a borrower wanted to buy, rather than rent, housing while attending medical school for four years. Further suppose that he/she found a home selling for eighty-five percent of appraised value, and on the lower end of property values in the neighborhood. In this case, a 5/1 Interest-Only ARM having a monthly payment amount that is fifty percent of the prevailing rate for a comparable rental unit makes perfect sense. Any principal repayments made by the borrower immediately reduce the next month's interest payment, due to the simple interest feature of this type of loan. Even without additional paydowns, the 5/1 I/O ARM is more affordable than a conventional loan and will be liquidated prior to the five year reset date in this example. The borrower is positioned to realize a gain on sale if the property value goes up, but is also protected if there is some depreciation (up to fifteen percent in this case) if property values are depressed at the time of liquidation. Again, the cost of renting in this example is twice that of financing the purchase, with no possibility of any capital appreciation on a comparable home over the same period of time. Furthermore, it is unfortunate that these same products, which are no longer available, or have a tarnished name, are precisely the type of loans that would offer advantages to a very broad segment of home buyers when the housing market is in a slump and home values are significantly depressed! Sadly, the removal of these types of financing vehicles will serve only to drive real estate prices down even further and lengthen the time it takes to sell the oversupply of housing stock that continues to be fueled by foreclosures.

The magnitude of the current crisis makes it abundantly clear that there is significant room, and need, for improvement in current credit assessment approaches. Various solutions have been suggested to deal with subprime issues, but a common theme has been the establishment of long-term segmentation solutions coupled with more systematic approaches. The Credit Assessment Framework naturally affords a sustainable and sensible segmentation based on all primary credit factors and it offers a systematic means for taking appropriate actions relative to those identified segments, and for on-going monitoring of the impact of those actions in a comprehensive and efficient manner. The credit assessment framework accomplishes this by expanding the boundaries of information associated with existing variable rate mortgage holders, appropriately segmenting them based upon primary factors, layering in needed secondary risk mitigation factors, assigning actions for each identified segment, and putting in place and adaptable policy mechanism that is responsive to the evolving economic climate. More specifically, the application of the credit assessment framework to 1) identify borrowers who need assistance and loans that can be salvaged to avoid foreclosure, 2) to measure the impact of strategies on foreclosure and loss exposures, and 3) to continuously update required actions to achieve the best possible outcomes in these difficult circumstances, entails the following steps:

1. Apply the credit assessment framework to current population of mortgage holders "at risk" now, or in the next "n" months.

2. Identify primary factors that will define the transaction contour

3. Assign actions for each identified segment

4. Determine mitigation rules as secondary (stage 2) factors

5. Put in place an adaptable policy mechanism that is responsive to the evolving economic climate 6. Update the system continuously using the system maintenance techniques described to ensure data are timely and complete 7. Monitor results regularly for accuracy and measure success using the system validation techniques described and simple trend analysis (is risk increasing, stable, or decreasing?)

8. For low/no documentation loans, consider augmenting with alternative data, attempt to determine actual capacity and capital to classify relative to the borrower contour A credit assessment framework that is sensible, transparent, and comprehensive is needed for both crisis intervention and prevention. Widespread use of flawed models is a root cause of the problem and not the loan products themselves. The credit assessment framework offers lending institutions the ability to approve, and better price, credit through the use of alternative data and new and improved models. It enables the construction of credit profiles across multiple categories and factors, and puts credit profiles in an appropriate context for assessment of borrower creditworthiness and also their loan repayment performance. The credit assessment framework uses advanced analytical models to estimate risk and forecast performance. It does so by leveraging a more meaningful segmentation, coupled with expanded source data 102 that has been integrated with judgmental factors and policy thresholds. The credit assessment framework's systematic segmentation approach has implications for both intervention in the mortgage crisis and prevention of future financial disruptions.

Prevention

The credit assessment framework can be used not only to deal with the current crisis but also to prevent future financial crisis. Classification of all credit transactions at their inception may be performed sensibly and comprehensively using the credit assessment framework and the Five C's of Credit. In preliminary discussions with major industry groups, it has been suggested that standardization of the credit assessment framework would pay huge dividends, as opposed to the case where each lending institution invents its own version of the primary factors and their associated thresholds. We agree and see great value in such a framework from several directions. Before discussing those advantages, we examine briefly what a standard framework might look like.

For a borrower contour, we have the example previously described in FIG. 4. Agreement would need to be reached on the exact factors that would be used to determine payment performance, capacity, and capital. Once the factors are agreed upon, thresholds relative to those factors would need to be specified to determine how many distinct classifications would be required for each of the three major categories, and how borrowers would be assigned to them. Once this system is put into place, lenders could capture and verify the credit contour for loans that are approved and report it to the credit bureaus along with the first report on that loan's payment performance. The credit bureaus would then possess a common definition of borrower qualification that is consistent and which would have immediate interpretation for the consumer. The consumer could request their credit bureau borrower contour to verify that it is accurate. There would be no need to keep the definitions secret.

The transaction contour would be constructed by augmenting the borrower contour relative to the last two C's of Credit, namely collateral and conditions. This process would be specific to the type of loan, e.g. credit card, auto loan, mortgage, etc. For a credit card, the additional categories might relate to features such as line amount and pricing tiers. For a mortgage loan, collateral categorization might be determined by the borrower's equity position relative to property valuation that is based on either current appraised value for fixed rate loans or estimated future value for variable rate loans. The thresholds might fall into three classifications, e.g. weak—less than fifteen percent, moderate—fifteen to thirty percent, and strong—greater than thirty percent. For a mortgage loan, the conditions category might classify loans according to whether they are fixed or variable priced and whether or not they are conforming, which would lead to four possible values, e.g. fixed and conforming, etc. For a home equity loan, a similar scheme to that for mortgages might be used, where borrower equity would need to take into consideration any/all senior lien positions for the equity position calculation and possibly whether or not the loan is a piggyback and whether or not the purpose of the loan is to improve the underlying loan collateral, and/or possibly whether or not the collateral is the borrower's primary residence.

Having the credit assessment framework in place would be advantageous not only to lenders for more accurate pricing of the true transaction risk, but also for creating homogeneous pools of assets for securitization and sale. With the credit assessment framework, the composition of securitized pools, or loans bundled for sale (with servicing retained or released) could be regulated by the transaction contour classifications. In the credit card arena, the credit score plays a dominant role in pricing the risk for sale to investors in the capital markets. The credit assessment framework contours would provide greater information and deliver superior pool performance over time, which will lower risk due to better diversification, lower cost in terms of fees charge by credit enhancers and insurers, and improve returns due to more reliable and sustainable cash flows. We see the secondary market players embracing the credit assessment framework in time as a best practice.

Another important related concern has been discussed relative to the need to be able to trace loans in investor pools back to their source through a unique identifier, like the nine character CUSIP associated with all North American securities that facilitates clearing and settlement of trades. We advocate that in designing the identifier, additional thought be given to building in some extra intelligence. To uniquely identify a loan, the originating institution, the loan booking system, and the original loan number would need to be codified at a minimum. We would like to see the transaction contour also imbedded in the universal loan identifier. The power afforded by having the contour in the identifier would be substantial. Pool performance could be monitored at the loan level and improved projections on delinquency, loss, and prepayments would be possible by building separate models based upon the contour segments.

Furthermore, the borrower contour can drive product offering choices relative to specific credit risk segments. Presumably, the most suitable mortgage product will vary widely by segment and may not be the most profitable loan for the bank, or the most inexpensive loan for the consumer. For the lender it avoids financial disruption through the use of forward-looking criteria and helps manage reserves, gauge suitability and affordability of different financial products, and captures early warning signals during the analysis process. In addition to early warnings, the credit assessment framework can be used to impose limits on portfolio segments so that crises can be averted and performance problems minimized. Portfolio limits can be based upon more granular regulatory guidelines made possible by the credit assessment framework, in addition to the institution's experience using the credit assessment framework which will afford greater information for portfolio management over time and afford stronger internal controls that can head off trouble before it cascades into huge losses for the institution. Based upon these facts, the credit assessment framework offers superior risk measurement through a sensible and transparent process that best serves the broadest spectrum of today's credit market, prime and non-prime alike.

As another example of the wide scope of the systems and methods disclosed herein, a system and method can be configured to have one or more of the following features:

Based on pragmatic market analysis, we identified some of the most important properties of a credit underwriting system. They are listed below, along with key capabilities of the credit assessment framework that relate to each one.

1. accurate: affords better risk estimation because it is a closer fit to the business reality 2. fast: computer-driven decisions, data and policy maintenance, operational & management reporting 3. cost-effective: fewer models required and model re-development costs virtually eliminated 4. flexible: best of art and science—rules co-exist with formulas 5. consistent: systematic and more consistent than credit scoring because there are virtually no system overrides 6. reliable: validated from both a quantitative and qualitative standpoint 7. easy to understand: BC/TC interpretable & foster borrower financial literacy 8. based on proven lending principles: 5 C's & common sense 9. rates the borrower's ability to repay the loan: capacity and capital required as primary factors 10. able to be effectively monitored: handle, and related multi-factor views, provide contextual meaning relative to acceptance rates, applicant population mix, and borrower segment performance relative to default risk, delinquency, pre-payment, profit, etc.

11. provides adequate controls to limit risk: policy caps can be enforced to avoid unwanted concentrations at the handle cell level 12. adaptive and easily updated" is more, not less, predictive over time!

In such a system and method, the holistic classification affords transparency, conveys the essence of the borrower's qualifications, and risk rates credit transactions within that complete context. As a result, significant overstatement or understatement of risk on individual loan transactions can be avoided. The credit assessment framework affords greater control of loan decisions through its ability to integrate expert judgment with statistically based criteria in the risk evaluation process, which encompasses not only default risk, but also concentration risk, fair lending non-compliance risk, and a host of other important objectives. This allows for efficiency, transparency, and accuracy. The credit assessment framework transparency fosters financial education/literacy relative to the underwriting process and enables easy identification of loans that are truly affordable relative to every borrower segment. Having a standardized version of the credit assessment framework would be that it could enable regulators to make comparisons across lenders, and more explicitly examine safety and soundness of loan underwriting practices and product offerings, and also monitor the diversity and vulnerability of loan portfolios in advance of adverse loan quality trends that not only occur during typical economic downturns, but also surface unexpectedly like the subprime mortgage crisis.

As yet another example of the wide scope of the systems and methods disclosed herein, the systems and methods disclosed herein can be used with the systems and methods disclosed in U.S. Application Ser. No. 61/130,319, (entitled "Computer-Implemented Risk Evaluation And Model Validation Systems And Methods" and filed on May 29, 2008); and U.S. patent application Ser. No. 12/325,468 filed Dec. 1, 2008 entitled "Computer-Implemented Risk Evaluation Systems And Methods" which claims priority to U.S. Patent Application Ser. No. 60/991,050 filed Nov. 29, 2007 entitled "Computer-Implemented Risk Evaluation Systems And Methods." The entire disclosures (including any and all figures) of all of these applications are incorporated herein by reference. For example, the systems and methods which include action tables disclosed in these applications may be used with the systems and methods disclosed herein for loan application evaluation.

Figure 15:
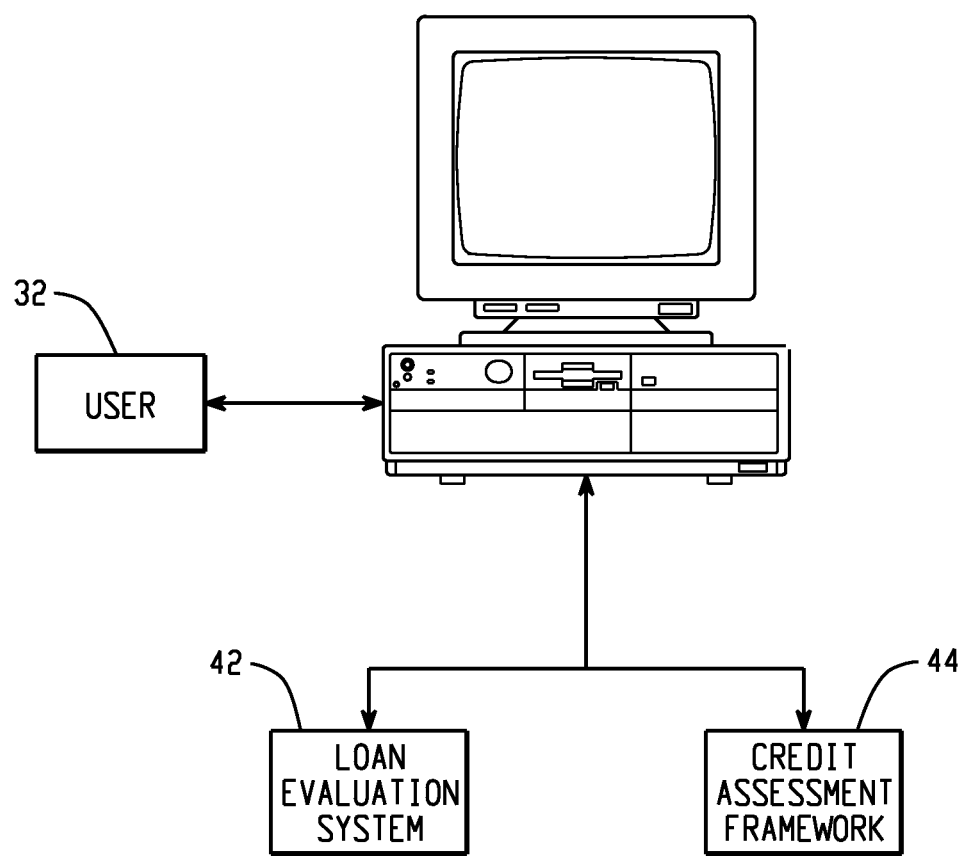
FIG. 15 is a block diagram depicting a single general purpose computer environment wherein a user can interact with a loan evaluation system.

As yet another example of the wide scope of the systems and methods disclosed herein, it is further noted that the systems and methods may be implemented on various types of computer architectures, such as for example on a single general purpose computer or workstation (as shown in FIG. 15), or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method of evaluating a loan application, comprising:
   generating, using one or more data processors, a borrower contour map, wherein the borrow contour map identifies a borrower score for each of a plurality of different combinations of borrower attributes, and wherein the borrower attributes include a character attribute, a capacity attribute, and a capital attribute;
   generating, using the one or more data processors, a transaction contour map, wherein the transaction contour map identifies a transaction score for each of a plurality of different combinations of transaction attributes, and wherein the transaction attributes include the borrower attributes, a collateral attribute, and a conditions attribute;
   performing, using the one or more data processors, a simulation corresponding to future economic conditions, wherein the simulation predicts performance of loans, and wherein the loans are associated with different borrower score-transaction score combinations;

generating, using the one or more data processors, a loan decision model using the predicted performances, wherein the loan decision model associates an action with each borrower score-transaction score combination;

receiving, using the one or more data processors, a loan application that includes one or more ratings for the borrower attributes and the transaction attributes;

assigning, using the one or more data processors, an application borrower score to the loan application using the borrower contour map and the borrower attribute ratings;

assigning, using the one or more data processors, an application transaction score to the loan application using the transaction contour map and the transaction attribute ratings; and determining, using the one or more data processors, an action for the loan application using the loan decision model, the application borrower score, and the application transaction score.

2. The method of claim 1, wherein the borrower score and the transaction score are based on a scale of 1-10.

3. The method of claim 1, wherein non-credit data is used in the simulation corresponding to future economic conditions.

4. The method of claim 1, wherein the borrower attributes include one or more primary underwriting factors from a set of primary underwriting factors.

5. The method of claim 4, wherein the transaction attributes include the set of primary underwriting factors.

6. The method of claim 1, wherein the actions include approval, denial, price, and terms.

7. The method of claim 6, wherein multiple loans of a loan portfolio are evaluated.

8. The method of claim 1, wherein the character attribute is based upon a payment history, a savings history, insurance coverage, an education level, or a stability measure.

9. The method of claim 1, wherein the capacity attribute is based upon income, debt obligations, cash obligations, living expenses, or number of dependents.

10. The method of claim 1, wherein the capital attribute is based upon net worth, amount of assets, or liquidity of assets.

11. The method of claim 1, wherein the loan decision model is validated by repeating the simulation.

12. The method of claim 1, further comprising:
generating a graphical interface for evaluating the loan application.

13. The method of claim 1, wherein the determined action is performed for the loan application.

14. A computer-implemented system for evaluating a loan application, comprising:
one or more data processors;
one or more computer-readable storage mediums containing instructions configured to cause the one or more processors to perform operations including:
generating a borrower contour map, wherein the borrow contour map identifies a borrower score for each of a plurality of different combinations of borrower attributes, and wherein the borrower attributes include a character attribute, a capacity attribute, and a capital attribute;
generating a transaction contour map, wherein the transaction contour map identifies a transaction score for each of a plurality of different combinations of transaction attributes, and wherein the transaction attributes include the borrower attributes, a collateral attribute, and a conditions attribute;

performing a simulation corresponding to future economic conditions, wherein the simulation predicts performance of loans, and wherein the loans are associated with different borrower score-transaction score combinations;

generating a loan decision model using the predicted performances, wherein the loan decision model associates an action with each borrower score-transaction score combination;

receiving a loan application that includes one or more ratings for the borrower attributes and the transaction attributes;

assigning an application borrower score to the loan application using the borrower contour map and the borrower attribute ratings;

assigning an application transaction score to the loan application using the transaction contour map and the transaction attribute ratings; and determining an action for the loan application using the loan decision model, the application borrower score, and the application transaction score.

15. The system of claim 14, wherein the borrower score and the transaction score are based on a scale of 1-10.

16. The system of claim 14, wherein performing the simulation includes using non-credit data corresponding to future economic conditions in the simulation.

17. The system of claim 14, wherein the borrower attributes include one or more primary underwriting factors from a set of primary underwriting factors.

18. The system of claim 17, wherein the transaction attributes include the set of primary underwriting factors.

19. The system of claim 14, wherein the actions include approval, denial, price, and terms.

20. The system of claim 19, wherein multiple loans of a loan portfolio are evaluated.

21. The system of claim 14, wherein the character attribute is based upon a payment history, a savings history, insurance coverage, an education level, or a stability measure.

22. The system of claim 14, wherein the capacity attribute is based upon income, debt obligations, cash obligations, living expenses, or number of dependents.

23. The system of claim 14, wherein the capital attribute is based upon net worth, amount of assets, or liquidity of assets.

24. The system of claim 14, wherein the operations further include validating the loan decision model by repeating the simulation.

25. The system of claim 14, wherein the operations further include: generating a graphical interface for evaluating the loan application.

26. The system of claim 14, wherein the determined action is performed for the loan application.

27. A computer-program product for evaluating a loan application, the computer-program product tangibly embodied in a machine-readable, non-transitory storage medium, the storage medium including instructions executable to cause a data processing apparatus to:
generate a borrower contour map, wherein the borrow contour map identifies a borrower score for each of a plurality of different combinations of borrower attributes, and wherein the borrower attributes include a character attribute, a capacity attribute, and a capital attribute;
generate a transaction contour map, wherein the transaction contour map identifies a transaction score for each of a plurality of different combinations of transaction attributes, and wherein the transaction attributes include the borrower attributes, a collateral attribute, and a conditions attribute;

perform a simulation corresponding to future economic conditions, wherein the simulation predicts performance of loans, and wherein the loans are associated with different borrower score-transaction score combinations;

generate a loan decision model using the predicted performances, wherein the loan decision model associates an action with each borrower score-transaction score combination;

receive a loan application that includes one or more ratings for the borrower attributes and the transaction attributes;

assign an application borrower score to the loan application using the borrower contour map and the borrower attribute ratings;

assign an application transaction score to the loan application using the transaction contour map and the transaction attribute ratings; and determine an action for the loan application using the loan decision model, the application borrower score, and the application transaction score.

28. The computer-program product of claim 27, wherein the borrower score and the transaction score are based on a scale of 1-10.

29. The computer-program product of claim 27, wherein non-credit data is used in the simulation corresponding to future economic conditions.

30. The computer-program product of claim 27, wherein the borrower attributes include one or more primary underwriting factors from a set of primary underwriting factors.

31. The computer-program product of claim 30, wherein the transaction attributes include the set of primary underwriting factors.

32. The computer-program product of claim 27, wherein the actions include approval, denial, price, and terms.

33. The computer-program product of claim 32, wherein multiple loans of a loan portfolio are evaluated.

34. The computer-program product of claim 27, wherein the character attribute is based upon a payment history, a savings history, insurance coverage, an education level, or a stability measure.

35. The computer-program product of claim 27, wherein the capacity attribute is based upon income, debt obligations, cash obligations, living expenses, or number of dependents.

36. The computer-program product of claim 27, wherein the capital attribute is based upon net worth, amount of assets, or liquidity of assets.

37. The computer-program product of claim 27, wherein the instructions are further executable to cause the data processing apparatus to validate the loan decision model by repeating the simulation.

38. The computer-program product of claim 27, wherein the instructions are further executable to cause the data processing apparatus to:
generate a graphical interface for evaluating the loan application.

39. The computer-program product of claim 27, wherein the determined action is performed for the loan application.

* * * * *